(12) United States Patent
Wada et al.

(10) Patent No.: US 11,418,685 B2
(45) Date of Patent: Aug. 16, 2022

(54) MONITORING CAMERA AND COVER

(71) Applicant: PANASONIC i-PRO SENSING SOLUTIONS CO., LTD., Fukuoka (JP)

(72) Inventors: Jyouji Wada, Fukuoka (JP); Daisuke Hara, Fukuoka (JP); Hideki Yasuda, Fukuoka (JP); Hideaki Yamada, Fukuoka (JP); Hiroki Yamanaka, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 133 days.

(21) Appl. No.: 16/922,756

(22) Filed: Jul. 7, 2020

(65) Prior Publication Data

US 2021/0014397 A1    Jan. 14, 2021

(30) Foreign Application Priority Data

Jul. 9, 2019  (JP) .............................. JP2019-127736
Dec. 27, 2019 (JP) .............................. JP2019-239171

(51) Int. Cl.
*H04N 5/225*    (2006.01)
*G02B 1/18*    (2015.01)

(52) U.S. Cl.
CPC .......... *H04N 5/22521* (2018.08); *G02B 1/18* (2015.01); *H04N 5/2252* (2013.01)

(58) Field of Classification Search
CPC .... G02B 1/18; G02B 27/0006; H04N 5/2252; H04N 5/22521
See application file for complete search history.

(56) References Cited

U.S. PATENT DOCUMENTS

| | | | | |
|---|---|---|---|---|
| 3,819,856 | A * | 6/1974 | Pearl ................ | G08B 13/19632 396/419 |
| 2009/0303325 | A1* | 12/2009 | Mizuno .................. | G08B 29/20 348/143 |
| 2016/0127643 | A1* | 5/2016 | Huerta ................. | H04N 5/2252 439/8 |
| 2016/0173744 | A1* | 6/2016 | Kim ..................... | H04N 5/2254 348/208.99 |
| 2017/0139310 | A1* | 5/2017 | Yasuda .................... | G02B 1/18 |
| 2018/0338118 | A1* | 11/2018 | Dellock ............. | G02B 27/0006 |
| 2019/0004274 | A1* | 1/2019 | Nakajima ............ | H04N 5/2254 |
| 2019/0227304 | A1* | 7/2019 | Eftekhari ............... | G03B 17/04 |
| 2020/0409237 | A1* | 12/2020 | Uchiyama .............. | G03B 17/56 |

FOREIGN PATENT DOCUMENTS

JP     2018-190609     11/2018

* cited by examiner

*Primary Examiner* — Amy R Hsu
(74) *Attorney, Agent, or Firm* — Greenblum & Bernstein, P.L.C.

(57) ABSTRACT

It is intended to increase the efficiency of heating of a cover by a heater. A monitoring camera is equipped with a capturing unit, a cover that has a dome-shaped curved portion and a flange portion and configured to cover the capturing unit, a transparent conductive film provided on an inner surface of the dome-shaped curved portion and the flange portion, and a pair of electrodes configured to supply power to the conductive film.

12 Claims, 18 Drawing Sheets

MONITORING CAMERA AND COVER

BACKGROUND OF THE INVENTION

1. Field of the Invention

The present disclosure relates to a monitoring camera and a cover.

2. Background Art

In cameras (e.g., monitoring cameras) having a dome-shaped cover, a configuration having a heater for heating the dome-shaped cover has been proposed (refer to JP-A-2018-190609, for example). By heating the cover, for example, the heater removes ice and snow sticking to the cover while suppressing sticking of ice and snow to the cover.

SUMMARY OF THE INVENTION

However, the heating of a cover by a heater still has room for consideration.

Non-restrictive embodiments of the present disclosure contribute to provision of a monitoring camera that is improved in the efficiency of heating of a cover by a heater.

A monitoring camera according to one embodiment of the disclosure comprises a capturing unit, a cover that has a dome-shaped curved portion and a flange portion and configured to cover the capturing unit, a transparent conductive film provided on an inner surface of the dome-shaped curved portion and the flange portion, a pair of electrodes configured to supply power to the conductive film.

This embodiment of the disclosure can increase the efficiency of heating of the cover by the heater.

Further advantages and effects of the embodiments of the disclosure will become apparent by the following description and the accompanying drawings. Whereas each of those advantages effects is provided by several embodiments and features described in the specification and the drawings, all of the features need not always be provided to attain one or more features.

DETAILED DESCRIPTION OF THE EXEMPLARY EMBODIMENT

Embodiments of the present invention will be hereinafter described in detail by referring to the accompanying drawings when necessary. However, unnecessarily detailed descriptions may be avoided. For example, detailed descriptions of well-known items and duplicated descriptions of constituent elements having substantially the same ones already described may be omitted. This is to prevent the following description from becoming unnecessarily redundant and thereby facilitate understanding of those skilled in the art.

The following description and the accompanying drawings are provided to allow those skilled in the art to understand the disclosure thoroughly and are not intended to restrict the subject matter set forth in the claims.

Embodiment 1

Figure 1:
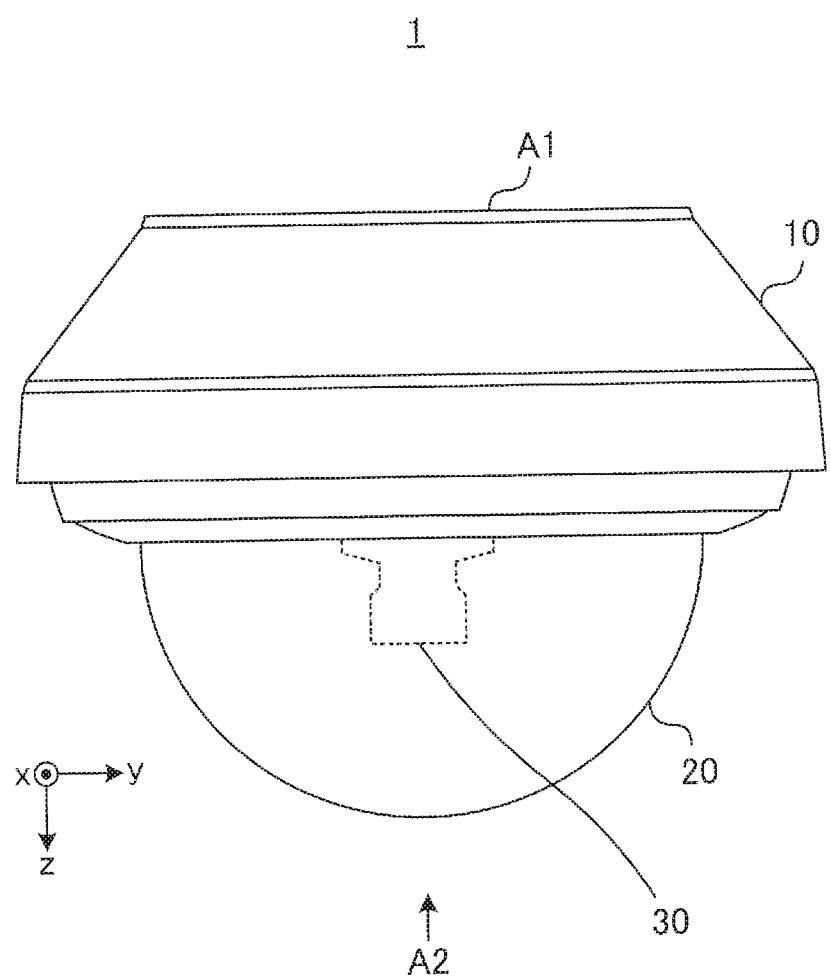
FIG. 1 is a side view of an example monitoring camera according to a first embodiment.

FIG. 1 is a side view of an example monitoring camera 1 according to a first embodiment. For example, the monitoring camera 1 shown in FIG. 1 may be installed on the pole of traffic lights installed at an intersection, on a utility pole, or outside a building (i.e., outdoors). The monitoring camera 1 is connected to an information processing device such as a personal computer (PC) wirelessly or by wire and may transmit images taken to the information processing device.

In the following, three coordinate axes shown in FIG. 1 are set for the monitoring camera 1.

As shown in FIG. 1, the monitoring camera 1 is equipped with, for example, a body 10, a cover 20, and a capturing unit(s) 30. For example, the body 10 has a surface A1 at the bottom. For example, the monitoring camera 1 may be fixed to the pole of traffic lights installed at an intersection, a utility pole, or a wall of a building via the surface A1.

The cover 20 is a dome-shaped (in other words, semispherical) cover. For example, the cover 20 may be made of a transparent or semitransparent material such as glass or plastic. Arrow A2 in FIG. 1 indicates the top of the cover 20.

The cover 20 covers one or plural capturing units 30 which is attached to the body 10. For example, the cover 20 is fixed to the body 10. The cover 20 protects the capturing unit 30 that is attached to the body 10.

The capturing unit(s) 30 is housed in the cover 20 and takes an image.

Figure 2:
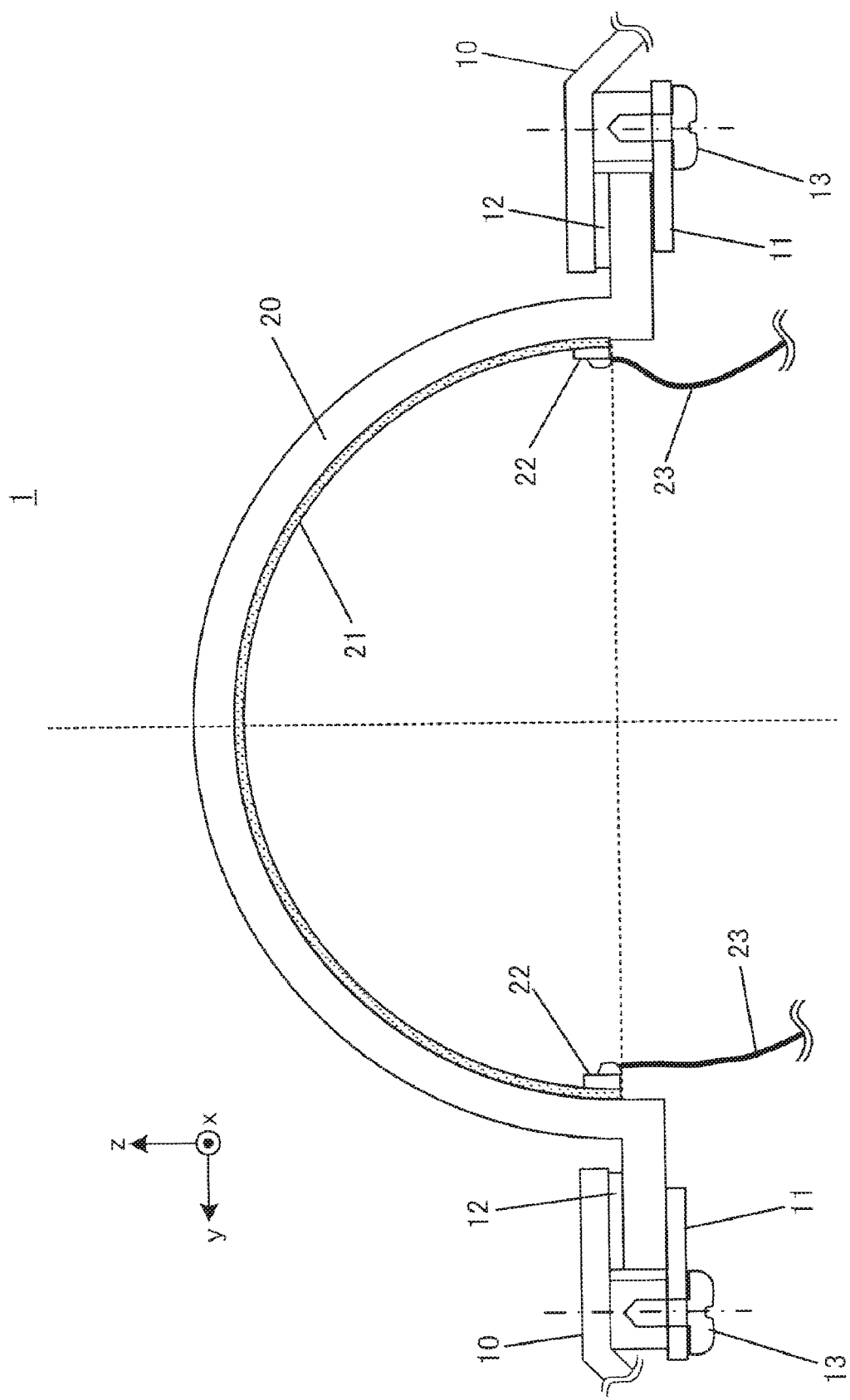
FIG. 2 is a sectional view of an example cover employed in the monitoring camera shown in FIG. 1.

FIG. 2 is a sectional view of the monitoring camera 1 shown in FIG. 1 taken by a Y-Z plane including the top of the cover 20. In FIG. 2 which shows a structure around the cover 20, part of the body 10 is omitted.

As shown in FIG. 2, for example, the cover 20 (e.g., a flange portion 403 of the cover 20) is fixed to the body 10 by a support member (in other words, fixing member) 11. For example, the cover 20 may be fixed to the body 10 in such a manner that screws 13 pass through holes formed through the support member 11 and are screwed to the body 10. The method for fixing the cover 20 to the body 10 is not limited to the method shown in FIG. 2.

As shown in FIG. 2, for example, a waterproof member 12 may be provided between the cover 20 and the body 10. The waterproof member 12 prevents entrance of water through a contact portion between the cover 20 and the body 10. The waterproof member 12 may be made of an elastic material such as rubber.

As shown in FIG. 2, a heater 21 for heating the cover 20 is formed on the inner surface of the cover 20. For example, the heater 21 is a transparent or semitransparent conductive film (in other words, transparent or semitransparent conductive layer or resistive body) that heats when energized. An example of the transparent or semitransparent conductive film is an ITO (indium-tin-oxide) film. For example, the heater 21 (e.g., ITO film) may be evaporated on the inner surface of the cover 20. The method for forming the heater 21 on the cover 20 (e.g., film forming method) is not limited to evaporation and may be any of other methods.

The heater 21 heats the cover 20 by heating up itself and thereby suppresses, for example, sticking of ice and snow to the cover 20. Furthermore, the heater 21 heats the cover 20 by heating up itself and thereby removes ice and snow sticking to the cover 20. In this manner, the heater 21 suppresses sticking of an object to the cover 20 or removes it and thereby prevents the monitoring camera 1 from suffering degradation in image quality.

For example, a pair of electrodes 22 are provided on the surface of the heater 21. The electrodes 22 are connected, by lead wires 23, to a power source (not shown) for supplying power (in other words, current) to the heater 21. As shown in FIG. 2, for example, the electrodes 22 may be provided on a circumferential portion of the heater 21 (e.g., on or around the bottom circle of the semisphere corresponding to the heater 21).

For example, the electrodes 22 may be disposed at confronting positions on the bottom circle of the semisphere corresponding to the heater 21 (e.g., positions that are separated from each other by 180° on the bottom circle). With this arrangement, the path length of currents flowing along the circular circumference of the heater 21 between the electrodes 22 coincides with that of a current flowing past the top of the heater 21 (e.g., shaped like a semispherical curved surface) between the electrodes 22. Thus, current flows uniformly through the heater 21 between the electrodes 22 and the heater 21 heats up uniformly.

The positions of the electrodes 22 for the heater 21 are not limited to the positions shown in FIG. 2, and, for example, the electrodes 22 may be provided at such positions as not interrupt the field of view of the capturing unit 30 in a state that the cover 20 is fixed to the body 10 (see FIG. 1).

Figure 3:
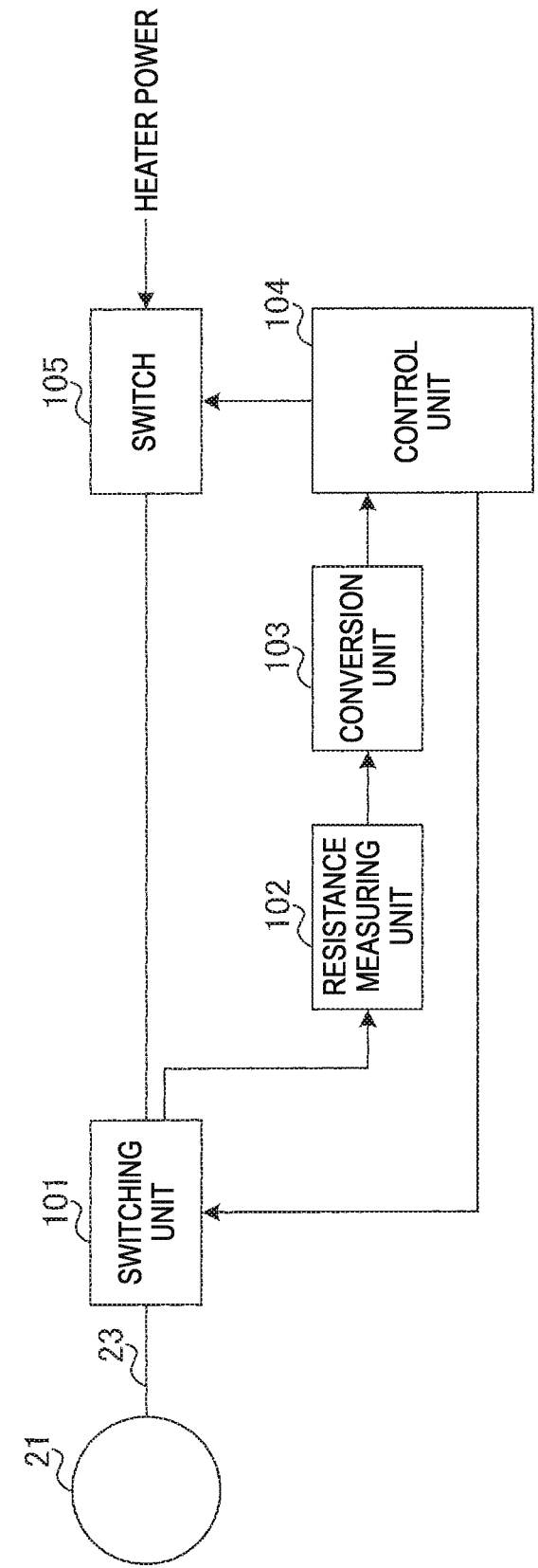
FIG. 3 is a block diagram showing an example configuration of the monitoring camera according to the first embodiment.

FIG. 3 is a block diagram showing an example configuration of the monitoring camera 1 in which the supply of power to the heater 21 shown in FIG. 2. For example, the monitoring camera 1 includes a switching unit 101, a resistance measuring unit 102, a conversion unit 103, a control unit 104, and a switch 105.

Figure 4:
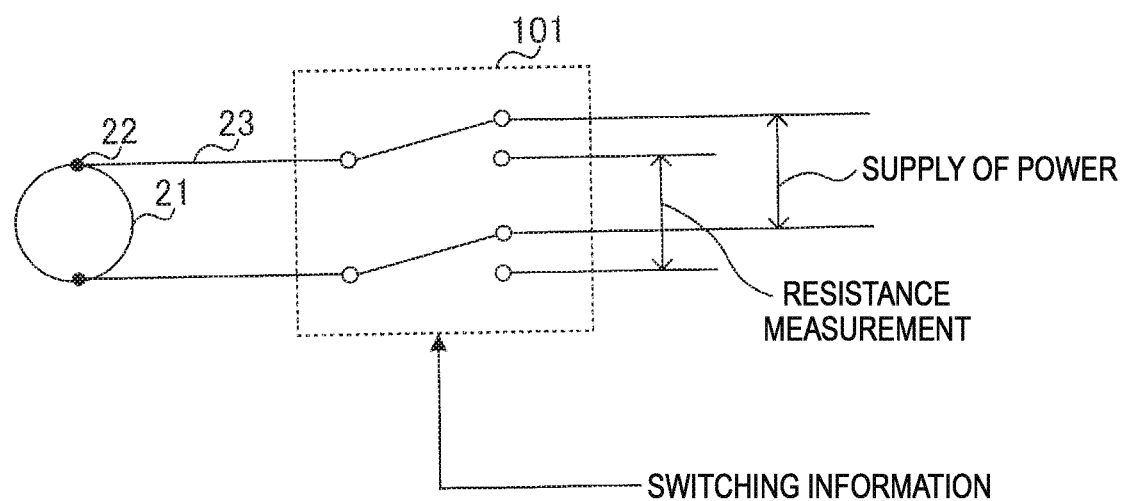
FIG. 4 shows an example configuration of a switching unit employed in the first embodiment.

For example, the switching unit 101 switches the switching destination between the resistance measuring unit 102 and the switch 105 on the basis of switching information received from the control unit 104. For example, when the switching unit 101 is connected to the switch 105, heater power is supplied to the heater 21 as shown in FIG. 4. On the other hand, when the switching unit 101 is connected to the resistance measuring unit 102, heater power is not supplied to the heater 21 as shown in FIG. 4 and a resistance value of the heater 21 is measured.

Referring to FIG. 3, when the switching unit 101 is connected to the resistance measuring unit 102, the resistance measuring unit 102 measures a resistance value of the heater 21 (e.g., a resistance value between the electrodes 22). The resistance measuring unit 102 outputs information indicating the measured resistance value to the conversion unit 103.

The conversion unit 103 converts the resistance value of the heater 21 indicated by the information received from the resistance measuring unit 102 into a temperature of the heater 21 according to, for example, a relationship between the resistance of the transparent or semitransparent conductive film (e.g., ITO film) constituting the heater 21 and its temperature (in other words, a temperature characteristic of the resistance). The conversion unit 103 outputs information indicating the temperature of the heater 21 to the control unit 104.

The control unit 104 controls the heater 21. For example, the control unit 104 controls the temperature of the heater 21 or the power supplied to it. For example, the control unit 104 may control the switching (e.g., on/off) of the supply of power of the switch 105 on the basis of the temperature of the heater 21 that is indicated by the information received from the conversion unit 103. For example, the control unit 104 outputs control information (e.g., information indicating "on" or "off") relating to the heater control to the switch 105.

The control unit 104 determines the connection destination (e.g., resistance measuring unit 102 or switch 105) of the switching unit 101. For example, the control unit 104 may determine the connection destination of the switching unit 101 on the basis of the timing of measurement of a resistance value of the heater 21 (in other words, a trigger of a resistance measurement (or temperature measurement). The control unit 104 outputs, to the switching unit 101, switching information indicating a determined switching destination (or a trigger of a resistance measurement). The timing of measurement of a resistance of the heater 21 may set to either regular timing or irregular timing.

The switch 105 switches the supply of power to the heater 21 (e.g., on/off of supply of power) on the basis of the control information received from the control unit 104.

Figure 5:
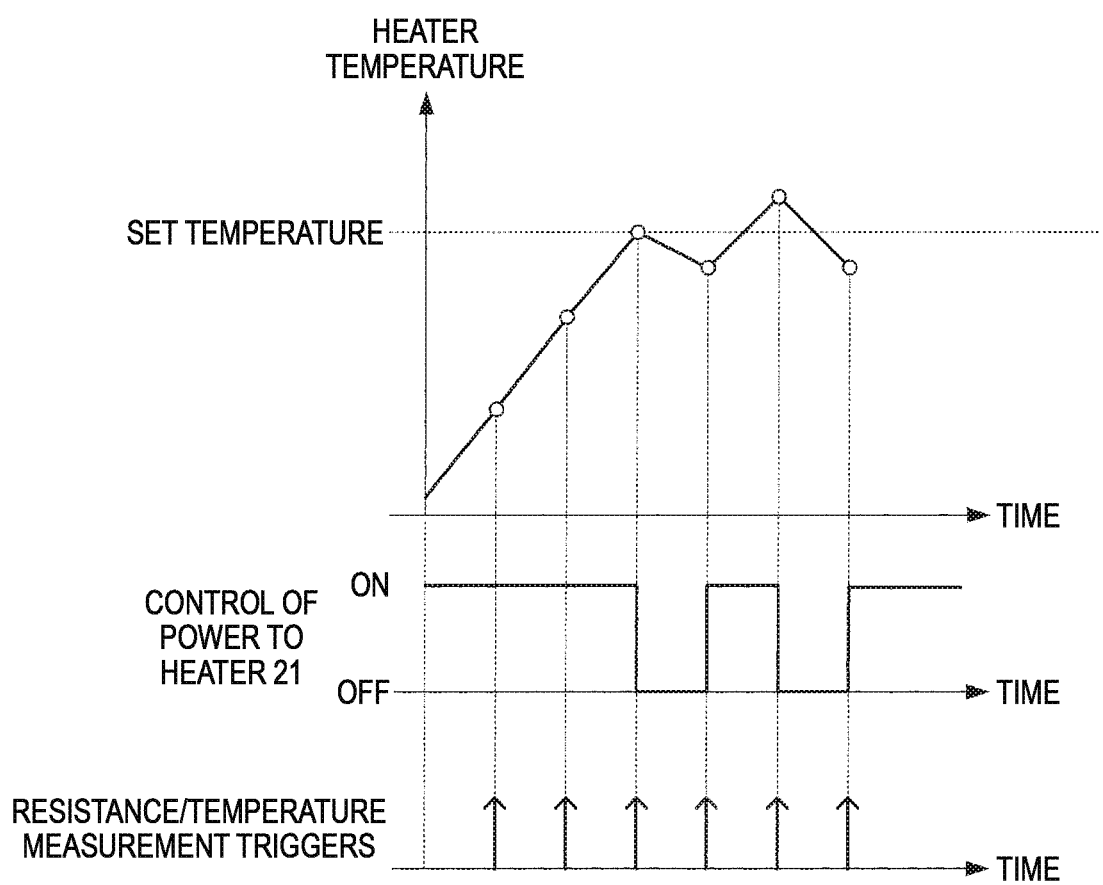
FIG. 5 is a diagram showing an example method for controlling a heater employed in the first embodiment.

FIG. 5 shows an example method for controlling the heater 21. FIG. 5 shows examples of a variation of the temperature of the heater 21 (may be called heater temperature), the control performed on the heater 21 (e.g., on/off of supply of power), and the timing of measurement of a resistance value (or temperature) of the heater 21 (in other words, measurement triggers).

As shown in FIG. 5, the resistance measuring unit 102 measures a resistance value of the heater 21 at each timing of a measurement trigger and the conversion unit 103 converts the measured resistance value into a temperature of the heater 21. For example, the control unit 104 compares the temperature of the heater 21 with a temperature (called a set temperature or a threshold value) that is set for control of the heater 21 and thereby controls the power supplied to the heater 21. For example, the set temperature of the heater 21 may be set at such a temperature (e.g., 10° C.) that ice and snow sticking to the cover 20 can be melted. The set temperature of the heater 21 may be either a fixed value or variable.

For example, as shown in FIG. 5, the control unit 104 turns on the heater 21 (in other words, supplies power to the heater 21) if the temperature of the heater 21 is lower than or equal to a set temperature. When the heater 21 is turned on, the heater 21 heats up and heats the cover 20.

On the other hand, if the temperature of the heater 21 is higher than the set temperature, the control unit 104 turns off the heater 21 (in other words, suspends the supply of power to the heater 21). When the heater 21 is turned off, heating the cover 20 by the heater 21 is stopped.

For example, the temperature of the heater 21 varies around the set temperature as a result of the control of the heater 21 shown in FIG. 5.

In the monitoring camera 1 according to the embodiment, the supply of power to the heater 21 (e.g., transparent or semitransparent conductive film) is controlled on the basis of a result of measurement of a resistance value of the heater 21 and the relationship between the resistance of the heater 21 and its temperature (in other words, the temperature characteristic of the resistance). In other words, in the monitoring camera 1, the temperature of the heater 21 (in other words, the surface temperature of the cover 20) is controlled on the basis of the temperature characteristic of the resistance value of the heater 21.

Where a temperature of the cover 20 were measured by a temperature sensor, one option would be to install the temperature sensor at, for example, a position that is not on the inner surface of the cover 20 so that it does not interrupt the field of view of the capturing unit 30, in other words, at a position that is distant from the cover 20. In this case, there may occur a difference between a temperature measured by the temperature sensor and a temperature of the heater 21 (or cover 20). And a measured temperature may vary depending on the installation position of the temperature sensor. Thus, with such a temperature control using a temperature sensor, the accuracy of the control of the heater 21 (e.g., power supply control) may be low.

In the embodiment, the monitoring camera 1 does not have a temperature sensor and, for example, a resistance value of the heater 21 is converted into a temperature of the heater 21. Since a measured resistance value of the heater 21 is a resistance value between the electrodes 22 and represents an average resistance value of the entire heater 21, a temperature of the heater 21 obtained by converting the resistance value of the heater 21 is an average temperature that represents an average temperature of the heater 21 (in other words, cover 20). In other words, a temperature of the heater 21 obtained by converting a resistance value of the heater 21 is not a temperature at a local position of the heater 21 unlike, for example, a temperature measured by a temperature sensor.

As a result, in the monitoring camera 1 according to the embodiment, the supply of power to the heater 21 can be controlled (in other words, the cover 20 can be heated by the heater 21) on the basis of a temperature of the entire heater 21. In other words, in the monitoring camera 1 according to the embodiment, the accuracy of measurement of a temperature of the heater 21 can be made higher than in, for example, a case that a temperature is measured by a temperature sensor. Since the accuracy of (the control of) supply of power to the heater 21 can be increased, the efficiency of heating of the cover 20 by the heater 21 can be increased.

(Modification 1)

Figure 6:
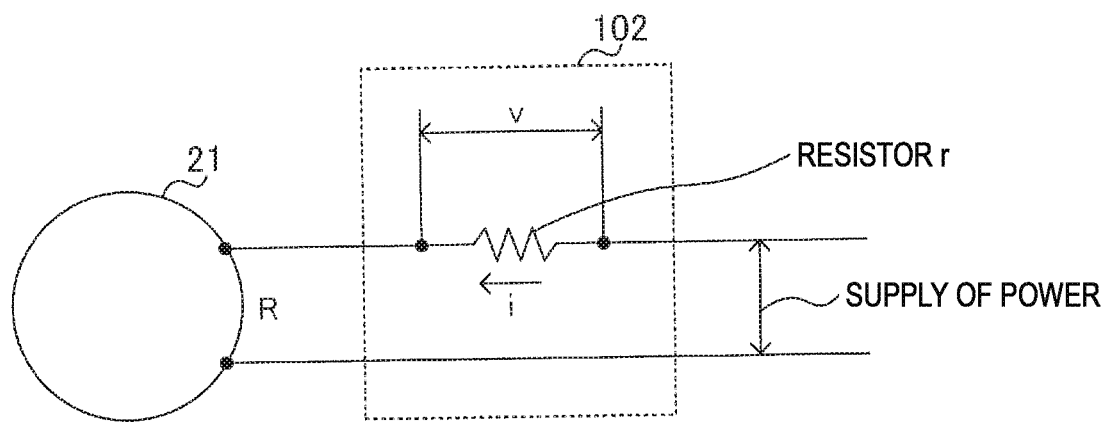
FIG. 6 is a circuit diagram showing an example configuration of a resistance measuring unit according to a first modification of the first embodiment.

The measurement method of a resistance value of the heater 21 in the monitoring camera 1 is not limited to the method shown in FIGS. 3 and 4. For example, as shown in FIG. 6, a resistance measuring unit 102 may be provided between the heater 21 and the power source for supplying power to the heater 21 (or switch 105). For example, the resistance measuring unit 102 shown in FIG. 6 may measure a resistance value R of the heater 21 on the basis of the resistance value of a resistor r provided inside, a current i flowing through the resistor r, and a voltage v across the resistor r.

For example, the resistance measuring unit 102 may calculate a resistance value R of the heater 21 on the basis of a measurement value of a voltage v that develops across the resistor r when a constant current i flows through the resistor r. Alternatively, the resistance measuring unit 102 may calculate a resistance value R of the heater 21 on the basis of a measurement value of a current i that flows when a constant voltage v is applied across the resistor r.

In the configuration shown in FIG. 6, the resistance measuring unit 102 measures a resistance value R of the heater 21 on the basis of a voltage value obtained in a state that the control unit 104 causes a constant current to flow through the heater 21 (e.g., ITO film) or a current value obtained in a state that the control unit 104 causes a constant voltage to develop across the heater 21. In this measurement method, the heater 21 is supplied with power even while a resistance is being measured by the resistance measuring unit 102. In other words, in the monitoring camera 1 having the configuration of FIG. 6, the supply of power to the heater 21 and the measurement of a resistance of the heater 21 can be performed parallel with each other.

Thus, according to the first modification, the efficiency of heating of the cover 20 by the heater 21 can be increased because the heater 21 can heat the cover 20 even during measurement of a resistance of the heater 21. Furthermore, according to the first modification, reduction in the efficiency of heating of the cover 20 by the heater 21 due to measurements of a resistance of the heater 21 can be suppressed.

In the configuration of FIG. 6, for example, the monitoring camera 1 need not be equipped with the switching unit 101 shown in FIG. 3.

(Modification 2)

Although in the first embodiment the supply of power to the heater 21 is on/off-switched in the manner shown in FIG. 5 to control the heater 21, the method for controlling the heater 21 is not limited to it. For example, an amount of power to be supplied to the heater 21 may be determined to control the heater 21.

Figure 7:
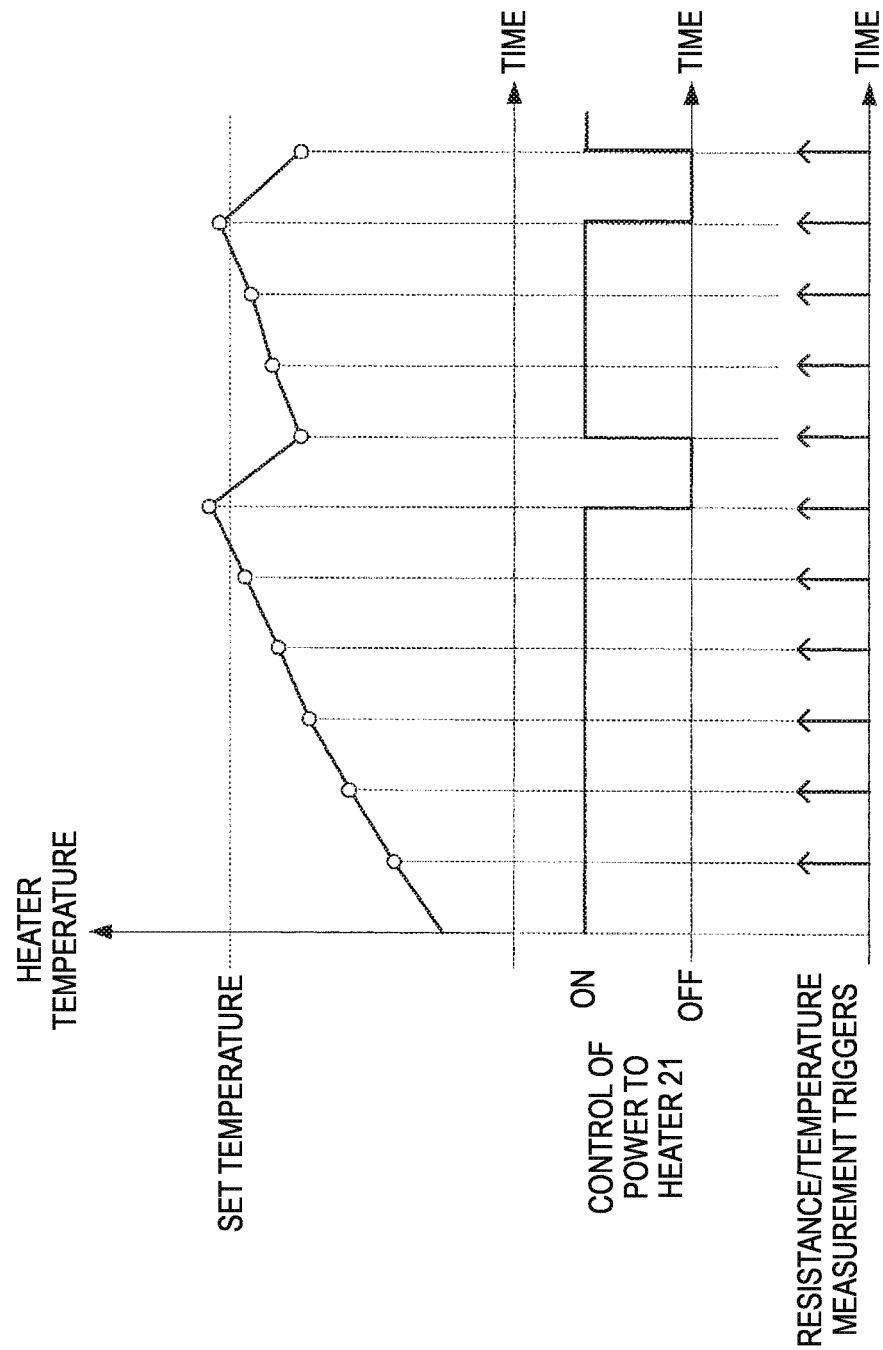
FIG. 7 is a diagram for description of an example method for controlling the heater employed in a second modification of the first embodiment.

FIG. 7 shows an example method for controlling the heater 21 to be employed in a case that the temperature of a place where the monitoring camera 1 is installed is lower than in the case of FIG. 5. In FIGS. 5 and 7, it is assumed that the same amount of power is supplied to the heater 21 in controlling the heater 21 according to a resistance value of the heater 21. Compare the temperature variations of the heater 21 shown in FIGS. 5 and 7: one can see that the rate of increase of the temperature of the heater 21 while the heater 21 is on is lower in FIG. 7 than in FIG. 5 and that the rate of decrease of the temperature of the heater 21 while the heater 21 is off is higher in FIG. 7 than in FIG. 5.

In view of the above, for example, the control unit 104 may set the amount of power to be supplied to the heater 21 per unit time larger in the method of FIG. 7 than in the method of FIG. 5. For example, the control unit 104 may determine an amount of power to be supplied to the heater 21 on the basis of an ambient temperature of the monitoring camera 1. An ambient temperature of the monitoring camera 1 may be detected by, for example, a sensor (not shown). For another example, the control unit 104 may determine an amount of power to be supplied to the heater 21 according to a variation of the resistance value or temperature of the heater 21 (see FIGS. 5 and 7).

With the above power supply control, even in a case that, for example, the air temperature is even lower and the rate of decrease of the temperature of the heater 21 is even higher, the temperature of the heater 21 can be increased more easily with heat generation and made closer to about a set temperature earlier.

(Modification 3) The control unit 104 may judge the kind of an object (e.g., ice and snow or water) sticking to the cover 20 on the basis of a temperature variation (or resistance variation) of the heater 21 with respect to an amount of power supplied to the heater 21. For example, the control unit 104 may determine a heat capacity of an object sticking to the cover 20 on the basis of a temperature variation of the heater 21 with respect to an amount of power supplied and judge whether the object sticking to the cover 20 is ice and snow (in other words, solid) or water (in other words, liquid) on the basis of the determined heat capacity of the object. A heat capacity of an object may either be calculated on the basis of an amount of power supplied and a temperature variation of the heater 21 or be determined according to a correlation (e.g., table) between the heat capacity of each object and the combination of the amount of power supplied and the temperature variation of the heater 21.

For example, the control unit 104 may an amount of power to be supplied to the heater 21 according to the judged kind of an object. For example, the control unit 104 may set an amount of power to be supplied larger in the case where the object is judged to be ice and snow (in other words, solid) than in the case where the object is judged to be water (in other words, liquid).

With the above manner of supply of power, the heater 21 heats up being supplied with an amount of power corresponding to the heat capacity of an object sticking to the cover 20. In the monitoring camera 1, since the heating by the heater 21 can be optimized according to the kind of an object sticking to the cover 20, the efficiency of heating of the cover 20 by the heater 21 can be increased.

(Modification 4)

For example, the control unit 104 shown in FIG. 3 may judge a degree of deterioration (e.g., aging deterioration) of the heater 21 on the basis of a resistance value of the heater 21 measured by the resistance measuring unit 102.

There is a tendency that the resistance value of the heater 21 increases as it deteriorates. For example, the control unit 104 may measure a resistance value of the heater 21 on a regular basis with a constant amount of power supplied and judge a degree of deterioration of the heater 21 on the basis of resistance values of the heater 21 measured regularly.

For example, the control unit 104 may judge that the heater 21 has deteriorated if an increase of the resistance value in a prescribed period is larger than a threshold value. In this case, for example, the control unit 104 may notify the outside of the deterioration of the heater 21.

The monitoring camera 1 can monitor a degree of deterioration of the heater 21 (in other words, cover 20) through a judgment as to a degree of deterioration of the heater 21 made by the control unit 104. A user (e.g., manager) of the monitoring camera 1 can determine when to perform maintenance work such as repair of the cover 20 (or monitoring camera 1) or replace it on the basis of a notice of deterioration of the heater 21.

For example, the manner of notification of deterioration of the heater 21 by the monitoring camera 1 may be such that information indicating deterioration of the heater 21 is transmitted to an external information processing apparatus (e.g., server) or a notification unit (not shown) provided in the monitoring camera 1 notifies the outside of deterioration in the form of a sound or light, or any of other manners.

(Modification 5)

The control unit 104 shown in FIG. 3 controls the supply of power to the heater 21 on the basis of a temperature of the heater 21 that is correlated with a resistance value of the heater 21. However, the method for controlling the supply of power to the heater 21 is not limited to this method. For example, the control unit 104 may control the supply of power to the heater 21 on the basis of a resistance value of the heater 21.

For example, the control unit 104 may control the supply of power to the heater 21 in such a direction that the resistance value of the heater 21 as measured by the resistance measuring unit 102 comes closer to a set resistance value (in other words, threshold value). For example, the resistance set resistance value may be set at a value corresponding to a set temperature in a temperature characteristic of the resistance (in other words, a relationship between the resistance value and the temperature) of the heater 21 (e.g., ITO film).

In the fifth modification, for example, the monitoring camera 1 need not be equipped with the conversion unit 103 shown in FIG. 3 because it is not necessary to convert a resistance value of the heater 21 into a temperature.

(Modification 6)

For example, the control unit 104 shown in FIG. 3 may store, in a memory (not shown), information indicating temperature values of the heater 21 that are input from the conversion unit 103. For example, the control unit 104 may predict a future temperature variation of the heater 21 by analyzing stored data relating to past temperatures of the heater 21 and controls the heater 21 on the basis of a prediction result.

According to the sixth modification, the accuracy of control of the heater 21 can be increased by the prediction of a temperature variation of the heater 21 and hence the efficiency of heating of the cover 20 by the heater 21 can be increased.

For example, the control unit 104 may control the heater 21 on the basis of a resistance value(s) (actual measurement value(s)) measured by the resistance measuring unit 102 and an above-described prediction result. For example, the control unit 104 may determine an amount of power to be supplied to the heater 21 on the basis of an actual measurement value(s) and correct the amount of power to be supplied on the basis of a prediction result.

Embodiment 2

In the first embodiment, the case where the inner and outer surfaces of the cover 20 are shaped like a semisphere is illustrated. In contrast, the second embodiment is directed to a case that the inner and outer surfaces of the cover are not shaped like a semisphere (e.g., they are part of a semisphere).

A monitoring camera 1 according to the second embodiment is different in configuration from the monitoring camera 1 according to the first embodiment (see FIGS. 1 and 2, for example) in the shapes of the cover and the heater. The configuration relating to the heater control of the monitoring camera 1 according to the second embodiment may be the same as that of the monitoring camera 1 according to the first embodiment (see FIG. 3, for example).

Figure 8:
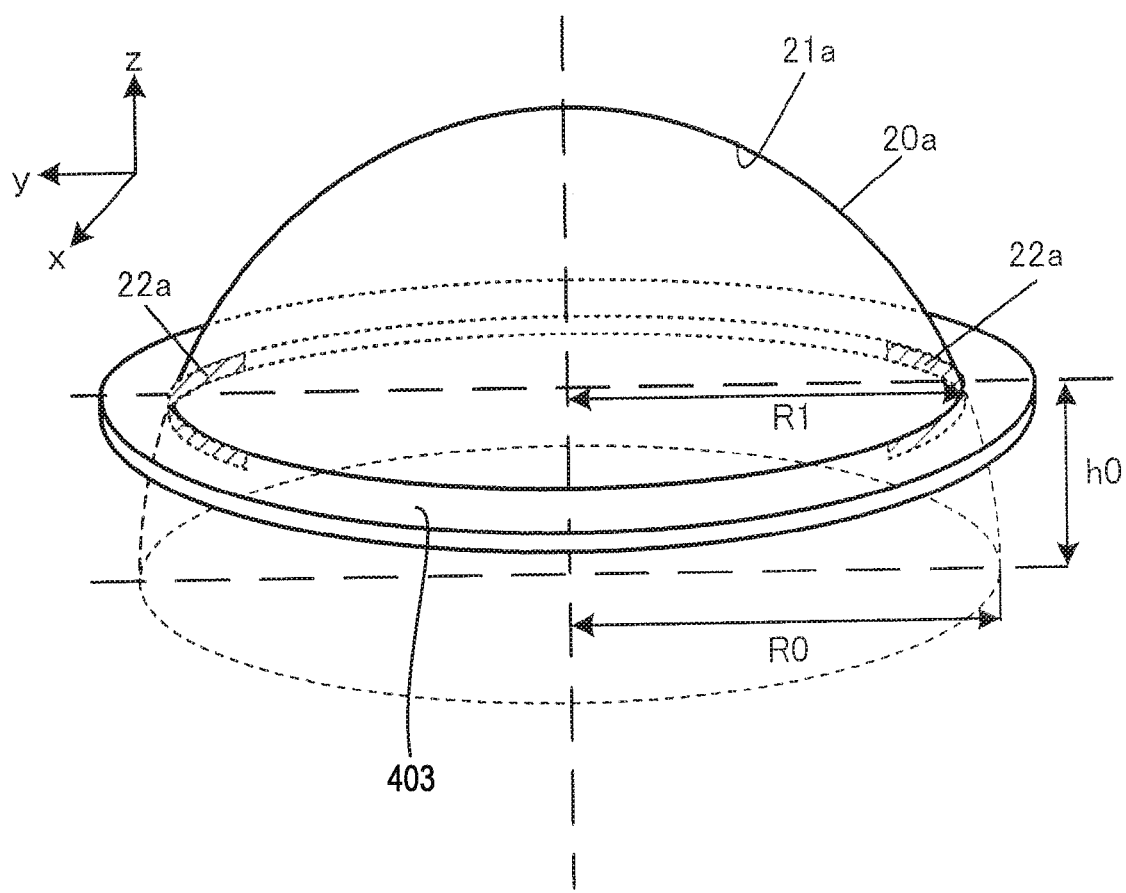
FIG. 8 is a perspective view of an example cover employed in a second embodiment.

FIG. 8 is a perspective view of an example of cover 20a according to this embodiment.

As shown in FIG. 8, the inner and outer surfaces of the cover 20a have a shape of part of a semisphere having a radius R0 (called a "partial sphere" or "dome shape," for example). For example, the inner and outer surfaces of the cover 20a have a shape of a partial sphere having, as a bottom circumference, a circle having a radius R1 that is located in the X-Y plane (see FIG. 8). For example, as shown in FIG. 8, the bottom circumference of the inner surface, shaped like a partial sphere, of the cover 20a is a circle having a radius R1 whose center is spaced from the center of a circle having the radius R0 of the sphere including the partial sphere by a distance h0 (also called a "height" or "offset") on the Z axis. In other words, as shown in FIG. 8, the distance between the center of the bottom circumference and the top of the inner surface of the cover 20a on the Z axis (in other words, the height of the inner surface on the Z axis) is equal to R0−h0.

As shown in FIG. 8, a heater 21a for heating the cover 20a is formed on a surface (e.g., inner surface) of the cover 20a. For example, the heater 21a is a transparent or semitransparent conductive film (e.g., ITO film) that heats up when energized. Like the cover 20a, the heater 21a has a shape of part of a semisphere having the radius R0. In other words, for example, the heater 21a has a shape of a partial sphere having, as a bottom circumference, a circle having the radius R1 that is located in the X-Y plane (see FIG. 8).

For example, a pair of electrodes 22a are provided on the surface of the heater 21a. The electrodes 22a are connected, by lead wires 23 (see FIG. 9, for example), to a power source (not shown) for supplying power (in other words, current) to the heater 21a. As shown in FIG. 8, for example, the electrodes 22a may be provided at a circumferential portion of the heater 21a (e.g., on or around the bottom circle of the partial sphere corresponding to the heater 21a).

For example, the electrodes 22a may be disposed at confronting positions on the bottom circle of the partial sphere corresponding to the heater 21 (e.g., positions that are separated from each other by 180° on the bottom circle). An example arrangement of the electrodes 22a will be described later.

Figure 9:
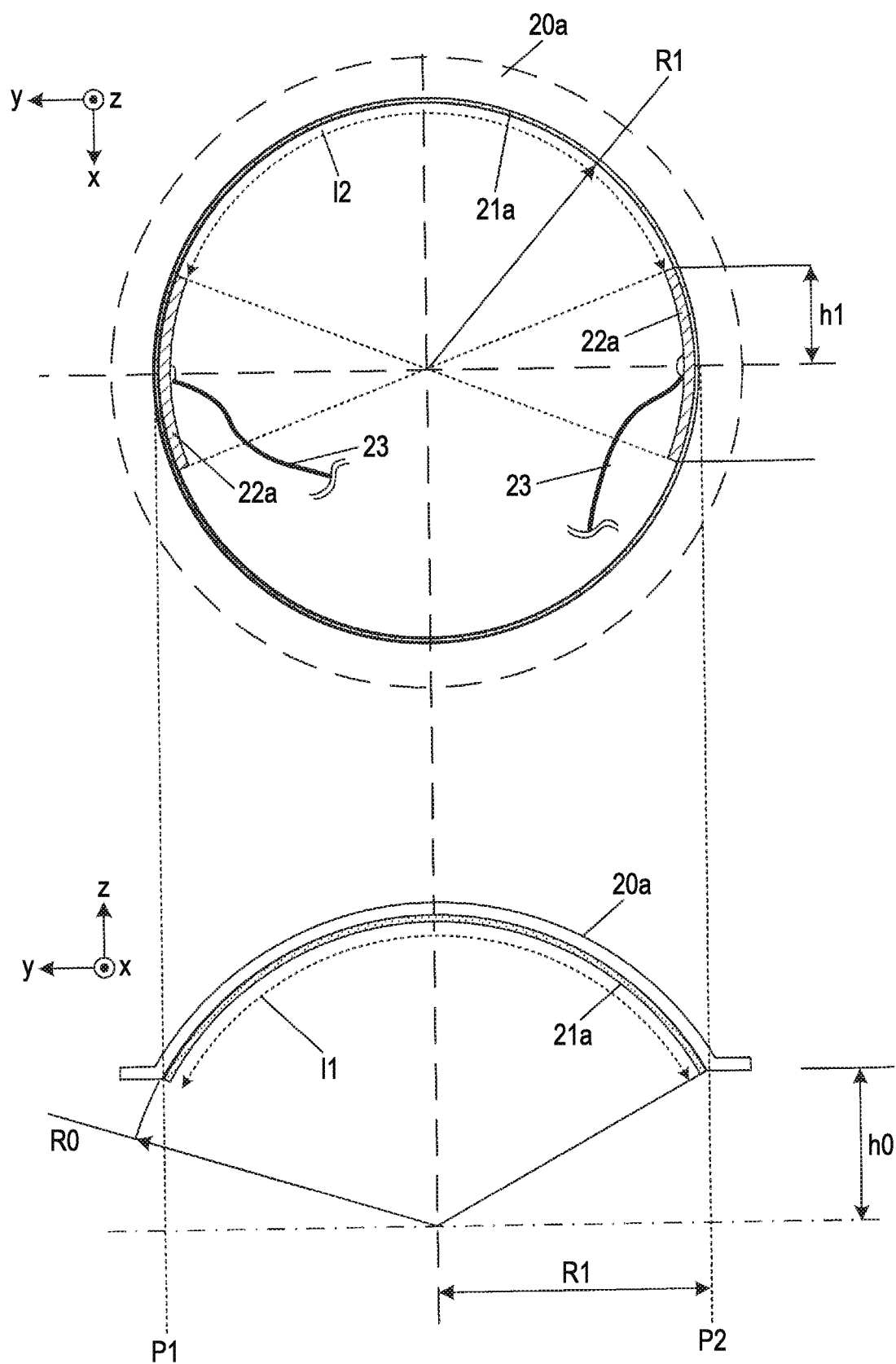
FIG. 9 is a top view and a sectional view of the example cover employed in the second embodiment.

FIG. 9 is a top view of the example cover 20a shown in FIG. 8 and a sectional view of the cover 20a shown in FIG. 8 taken perpendicularly to a Y-Z plane including the top of the cover 20a.

For example, as shown in FIG. 9, the pair of electrodes 22a are provided along the circular circumference having the radius R1. For example, as shown in FIG. 9, the two ends of each electrode 22a are located at positions that are spaced from the diameter, passing through the centers of the electrodes 22a, of the circle that is the bottom circumference of the partial sphere as the inner surface of the cover 20a and has the radius R1 by a distance h1 in the positive and negative directions in the X-axis direction.

Referring to FIG. 9, the length of the pair of electrodes 22a is set according to the path length of a current that flows between the pair of electrodes 22a along the circular circumference of the heater 21a and the path length of a current that flows between the pair of electrodes 22a past the top of the dome-shaped curved surface of the heater 21a. In other words, the distance h1 is determined according to a distance h0 shown in FIG. 9.

An example method for determining the distance h1 will be described below.

As shown in FIG. 9, in the case where h0>0 (in other words, inner surface of the cover 20a and the heater 21a are shaped like a partial sphere), the radius R1 is shorter than the radius R0. Where the radius R1 is shorter than the radius R0, as shown in FIG. 9, the distance between points P1 and P2 along the circumference direction of the heater 21a (half of the length of the circumference having the radius R1) is longer than the distance between the points P1 and P2 along the path passing through the top of the heater 21a (i.e., a distance l1 shown in FIG. 9).

Current tends to flow between electrodes along a shorter path (in other words, a path having a smaller resistance). Assume a case that in FIG. 9 the distance h0 is longer than 0 and a pair of electrodes (not shown) are provided at the positions P1 and P2. In this case, more current tends to flow along the path (hereinafter referred to as a "top path") that passes through the top of the dome-shaped curved surface of the heater 21a than paths (hereinafter referred to as "side paths") that are along the circular circumference (e.g., the circle having the radius R1) of the heater 21a. In this case, a heating region of the heater 21a could be distributed locally around the top path which is shorter than the side paths in the length between the electrodes. In other words, unevenness (in other words, current unevenness) occurs in the heating region of the heater 21a, as a result of which the region where the heater 21 can heat the cover 20a becomes nonuniform and the heating efficiency could be lowered.

In view of the above, in the second embodiment, the shape of the electrodes 22a (e.g., the distance h1 shown in FIG. 9) is determined according to, for example, the shape of the cover 20a or the heater 21a (e.g., the distance h0 shown in FIG. 9).

For example, the length of each of the pair of electrodes 22a along the circular circumference of the heater 21a may be set so that the side path length l2 and the top path length l1 coincide with each other, in other words, so that the resistance between the pair of electrodes 22a along the top path coincide with that along each side path. The side path length l2 is the distance between the ends of the electrodes 22a along the circumference of the heater 21a.

The path lengths l1 and l2 need not always coincide with each other; for example, it suffices that their difference |l1−l2| falls within a prescribed allowable range (e.g., error range).

For example, the distance h1 shown in FIG. 9 is determined so that the top path length l1 and the side path length l2 coincide with each other. Each electrode 22a may be formed along the circumference direction of the heater 21a on the basis of the thus-determined distance h1.

In this embodiment, the current paths along the circumference of the heater 21a (i.e., side paths) are shortened by forming the electrodes 22a along the circumference of the heater 21a so as to have a length corresponding to the distance h1. In other words, the current paths along the circumference of the heater 21a (i.e., side paths) are shortened by short-circuiting the portion, lying under each electrode 22a along the circumference of the heater 21a, of the heater 21a by the electrode 22a. As the distance h0 increases, the distance h1 is made longer and the side path length l2 is made shorter. The relationship l1=l2 is established by shortening the side path length l2 in this manner.

When l1=l2, the differences between the lengths of current paths (including the side paths and the top path) between the electrodes 22a across the entire heater 21a are made smaller and hence current supplied to the heater 21a tends to flow uniformly between the electrodes 22a across the heater 21a. Since current flows uniformly, the heating region of the heater 21a can be made uniform. In other words, the unevenness of the heating region (in other words, current unevenness) of the heater 21a can be lowered.

Thus, according to this embodiment, the heater 21a can heat the cover 20a uniformly and hence the efficiency of heating of the cover 20a by the heater 21a can be increased even in the case where the inner surface of the cover 20a is not shaped like a semisphere (e.g., it has a shape of part of a semisphere).

Embodiment 3

For example, in the cover 20 of the monitoring camera 1 shown in FIG. 1, it is expected that regions where ice and snow (or supercooled water originating from rain) can be stuck to the cover 20 and frozen (hereinafter referred to as "frozen regions") vary depending on the environment of the monitoring camera 1. For example, frozen regions may vary depending on the wind direction with respect to the monitoring camera 1.

Thus, regions that interrupt the field of view of the capturing unit 30 due to freezing of the cover 20 and cause degradation of an image taken can vary depending on the environment of the monitoring camera 1. In other words, regions, to be heated by the heater 21, of the cover 20 can vary depending on the environment of the monitoring camera 1. For example, when frozen regions occur unevenly on the cover 20 and the whole of the cover 20 is heated uniformly by the heater 21, the cover 20 is also heated in regions other than the frozen regions (in other words, regions that need not be heated), as a result of which the efficiency of heating of the cover 20 can lower.

In a monitoring camera 1 according to this embodiment, the heating region of the cover 20 is made variable by switching the heating region of the heater 21.

For example, in the monitoring camera 1, the region to be heated by the heater 21 (in other words, the heating region of the cover 20) may be switched according to the environment of the monitoring camera 1. For example, in the monitoring camera 1, in a situation that ice and snow are stuck to the entire cover 20, the heater 21 may be heated uniformly so as to heat the entire cover 20 uniformly. With respect to the monitoring camera 1, in a situation that ice and snow are stuck to part(s) of the cover 20, part of the heater 21 may be heated so as to heat part(s) of the cover 20 (local heating).

The monitoring camera 1 according to this embodiment is different in configuration from the monitoring camera 1 according to the first embodiment (see FIG. 2, for example) in the number of electrodes 22 provided on the cover 20.

Figure 10:
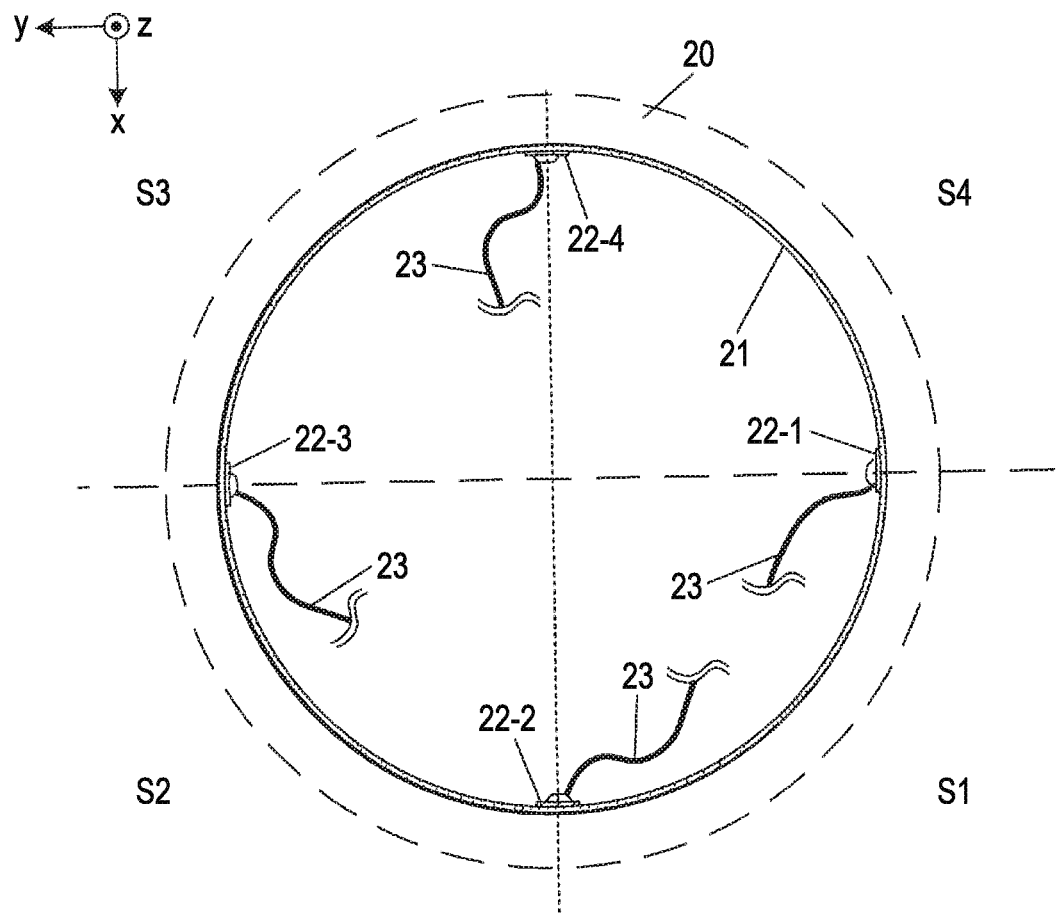
FIG. 10 is a top view of an example cover employed in a third embodiment.

FIG. 10 is a top view of an example cover 20 employed in this embodiment. In FIG. 10, constituent elements having the same ones in the first embodiment (see FIG. 2, for example) are given the same reference symbols as the latter.

In the example shown in FIG. 10, four electrodes 22-1 to 22-4 (hereinafter may be referred to together simply as "electrodes 22") are provided at different positions on the heater 21 (e.g., ITO film) formed on the inner surface of the cover 20.

For example, a current flows through the heater 21 via two of the four electrodes 22-1 to 22-4. Thus, the current path between the two electrodes 22 varies depending on the two electrodes 22 to which a current is supplied.

For example, where a current flows through the heater 21 via the pair of electrodes 22-1 and 22-3 (or 22-2 and 22-4), uniform current flows through the heater 21 between the two electrodes 22 because the top path length is equal to the side path length. As a result, the entire heater 21 heats up uniformly and the entire cover 20 can be heated uniformly.

On the other hand, where a current flows the heater 21 via adjacent electrodes 22 (e.g., electrodes 22-1 and 22-2), current tends to flow through a region of the heater 21 located between the adjacent electrodes 22 more than in regions around the other electrodes 22 (e.g., electrodes 22-3 and 22-4). As a result, unevenness occurs in the heating region of the heater 21 and part of the cover 20 is heated (local heating). The heated local region of the cover 20 varies depending on the combination of electrodes 22 via which a current is supplied.

For example, in the monitoring camera 1, a pair of electrodes 22 via which a current (in other words, power) is to be supplied to the heater 21 are selected from three or more (four in FIG. 10) electrodes 22 on the basis of a detection result or a prediction result of frozen regions of the cover 20.

Figure 11:
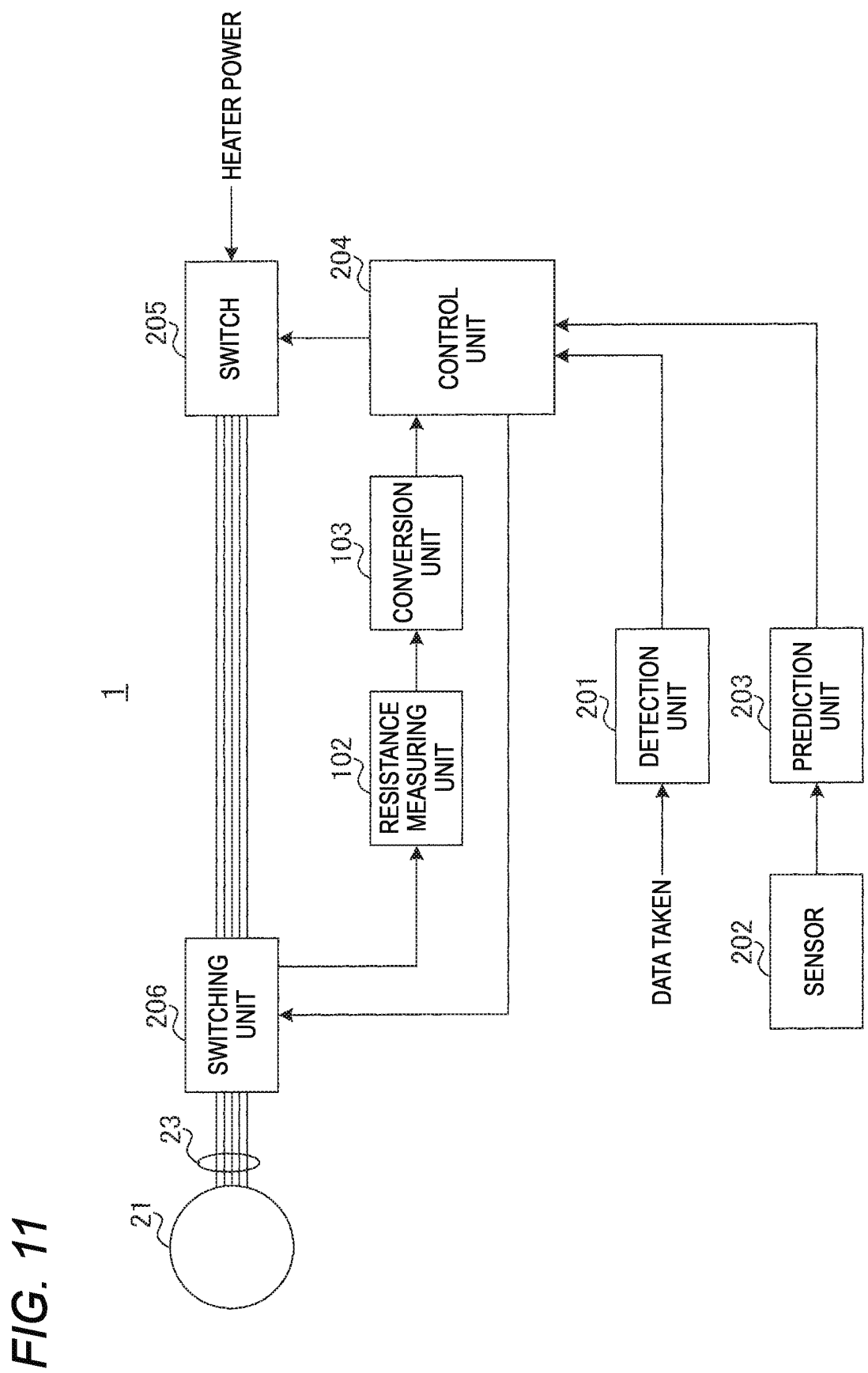
FIG. 11 is a block diagram showing an example configuration of the monitoring camera according to the third embodiment.

FIG. 11 is a block diagram showing an example configuration of the monitoring camera 1 according to the embodiment. In FIG. 11, constituent elements having the same ones in the first embodiment (see FIG. 3) are given the same reference symbols as the latter and will not be described. The resistance measuring unit 102 shown in FIG. 11 may be the same in configuration as that shown in FIG. 6 (in other words, a switching unit 206 is not provided).

As shown in FIG. 11, for example, image data taken by the capturing unit 30 is input to a detection unit 201. The detection unit 201 detects frozen regions on the surface of the cover 20 (in other words, regions in which ice and snow are stuck) on the basis of the image data taken. In other words, the detection unit 201 detects regions in which the cover 20 is to be heated. For example, the detection unit 201 outputs information indicating the detected regions to a control unit 204.

For example, a sensor 202 detects information relating to the environment of the monitoring camera 1. For example, the information relating to the environment of the monitoring camera 1 is information including a wind direction with respect to the monitoring camera 1, weather, or another kind of information. The sensor 202 outputs the detected information to a prediction unit 203.

The prediction unit 203 predicts regions, in which ice and snow could stick, on the surface of the cover 20 (hereinafter referred to as "freezing-predicted regions") on the basis of the information received from the sensor 202. For example, the prediction unit 203 may predict freezing-predicted regions on the basis of a wind direction included in the information received from the sensor 202. The prediction unit 203 outputs information indicating the freezing-predicted regions to the control unit 204.

In the embodiment, the monitoring camera 1 may be equipped with either one or both of the detection unit 201 and the prediction unit 203 (and the sensor 202). What detect frozen region and predict freezing-predicted regions are not restricted to the units shown in FIG. 11. For example, the monitoring camera 1 may be equipped with other units that detect frozen region and predict freezing-predicted regions by methods that are different from the detection method of the detection unit 201 and the prediction method of the prediction unit 203.

The control unit 204 selects a pair of electrodes 22 via which to supply a current to the heater 21 from the plural (four in FIG. 10) electrodes 22. For example, the control unit 204 may select electrodes 22 that make it possible to heat the cover 20 in frozen regions that are indicated by information received from the detection unit 201. For another example, the control unit 204 may select electrodes 22 that make it possible to heat the cover 20 in freezing-predicted regions that are indicated by information received from the prediction unit 203.

The control unit 204 may select electrodes 22 on the basis of both of information received from the detection unit 201 and information received from the prediction unit 203. The control unit 204 outputs control information indicating the selected electrodes 22 to the switch 205 and the switching unit 206. For example, the control unit 204 may weight the information received from the detection unit 201 and the information received from the prediction unit 203.

A description will be made of an example case that the surface of the cover 20 is divided into four portions corresponding to respective regions S1-S4 in the X-Y plane (see FIG. 10). However, the manner of dividing the surface of the cover 20 is not restricted to this case; the surface of the cover 20 may be divided into another number of regions.

For example, if the region S1 of the cover 20 is selected by at least one of the detection unit 201 and the prediction unit 203, the control unit 204 may select the electrodes 22-1 and 22-2. In this case, a current is supplied to the heater 21 via the electrodes 22-1 and 22-2, in which case the portion of the heater 21 in the region S1 around a current path between the electrodes 22-1 and 22-2 tends to heat up more than the portions of the heater 21 in the other regions. Thus, the portion of the cover 20 in the region S1 is heated locally, whereby ice and snow sticking to that portion of the cover 20 can be melted or sticking of ice and snow to that portion (in other words, freezing of ice and snow there) can be suppressed.

Likewise, if the region S2 of the cover 20 is selected by at least one of the detection unit 201 and the prediction unit 203, the control unit 204 may select the electrodes 22-2 and 22-3. In this case, a current is supplied to the heater 21 via the electrodes 22-2 and 22-3, in which case the portion of the heater 21 in the region S2 around a current path between the electrodes 22-2 and 22-3 tends to heat up more than the portions of the heater 21 in the other regions. Thus, the portion of the cover 20 in the region S2 is heated locally, whereby ice and snow sticking to that portion of the cover 20 can be melted or sticking of ice and snow to that portion (in other words, freezing of ice and snow there) can be suppressed.

If the region S3 or S4 of the cover 20 is selected by at least one of the detection unit 201 and the prediction unit 203, the control unit 204 may select a pair of electrodes 22 that make it possible to heat the portion of the heater 21 in the selected region locally, in the same manner as in the case where the region S1 or S2 is selected.

If two or more of the regions S1-S4 of the cover 20 are selected by at least one of the detection unit 201 and the prediction unit 203, the control unit 204 may select a pair of electrodes 22 that make it possible to heat the entire cover 20 uniformly.

For example, if the regions S1 and S2 of the cover 20 are selected by at least one of the detection unit 201 and the prediction unit 203, the control unit 204 may select the electrodes 22-1 and 22-3. In this case, a current is supplied to the heater 21 via the electrodes 22-1 and 22-3, in which case the entire heater 21 tends to heat up uniformly. Thus, a portion of the cover 20 including the portions in the regions S1 and S2 is heated, whereby ice and snow sticking to that portion of the cover 20 can be melted or sticking of ice and snow to that portion (in other words, freezing of ice and snow there) can be suppressed. If the regions S1 and S2 of the cover 20 are selected, alternatively, the control unit 204 may select the electrodes 22-2 and 22-4.

Referring to FIG. 11, the switch 205 switches the pair of electrodes 22 to which to supply heater power (in other words, heater current) among the plural electrodes 22 on the basis of control information received from the control unit 204.

As in the first embodiment (see FIG. 3), for example, the switching unit 206 switches the switching destination between the resistance measuring unit 102 and the switch 205 on the basis of control information received from the control unit 104. Furthermore, the switching unit 206 switches the pair of electrodes 22 to which to supply heater power (in other words, heater current) among the plural electrodes 22 on the basis of control information received from the control unit 204.

With the above configuration, if the switching unit 206 is connected to the resistance measuring unit 102, for example, the resistance measuring unit 102 measures a resistance value between the pair of electrodes 22 via which a current is to be supplied to the heater 21. In other words, the pair of electrodes 22 via which the resistance measuring unit 102 is to measure a resistance value may vary depending on which of the plural electrodes 22 are selected by the control unit 204. For example, the control unit 204 controls the supply of power to the heater 21 according to the resistance value (in other words, temperature) between the selected pair of electrodes 22.

According to the embodiment, by virtue of the switching of the pair of electrodes 22 via which a current is to be supplied to the heater 21, even in the case where, for example, frozen regions (or freezing-predicted regions) of the cover 20 are distributed unevenly, the cover 20 can be heated in the frozen regions locally. Thus, in the embodiment, the efficiency of heating of the cover 20 by the heater 21 can be increased.

Although in the embodiment the heater 21 is provided with the four electrodes 22, the disclosure is not limited to this case; the number of electrodes 22 may be larger than or equal to three. For example, in the monitoring camera 1, a heating region can be selected from more divisional regions of the cover 20 as the heater 21 is provided with more electrodes 22.

Embodiment 4

A monitoring camera 1 according to a fourth embodiment is different from the monitoring camera 1 according to the first embodiment (refer to FIGS. 1 and 2, for example) in the structure of a cover 20. In this embodiment, the heater 21 may be controlled by the same configuration as in the first embodiment (see FIG. 3, for example).

Figure 12:
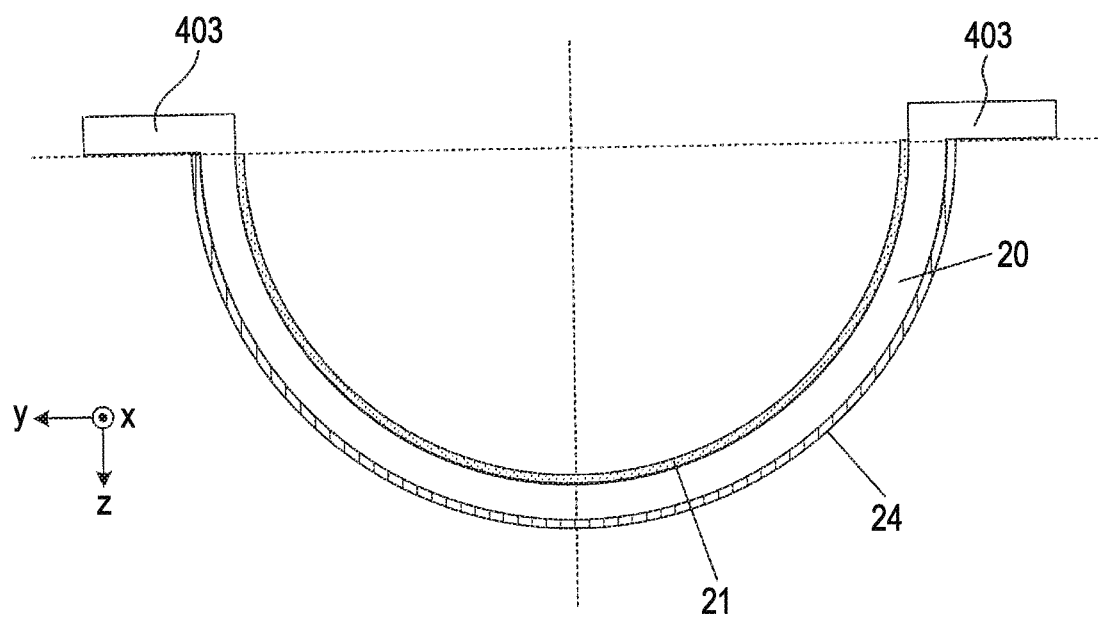
FIG. 12 is a sectional view of an example cover employed in a fourth embodiment.

FIG. 12 is a sectional view of the monitoring camera 1 taken by a Y-Z plane including the top of the cover 20. The body 10, the electrodes 22, and the lead wires 23 are omitted in FIG. 12.

As shown in FIG. 12, the heater 21 (e.g., ITO film) is formed on the inner surface (top surface in FIG. 12) of the cover 20 in the same manner as in the first embodiment.

In this embodiment, a hydrophilic film (also called a hydrophilic layer or a hydrophilic coat) 24 is formed on the outer surface (bottom surface in FIG. 12) of the cover 20.

Figure 13:
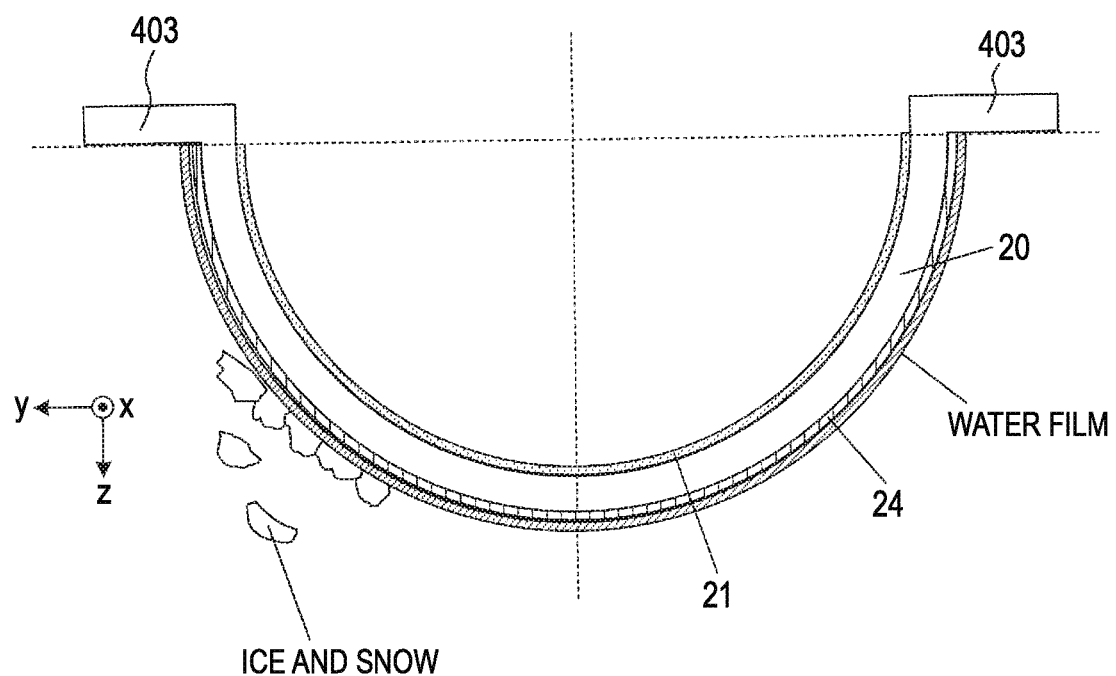
FIG. 13 is a sectional view for description of a method for removing ice and snow in the fourth embodiment.

For example, when the cover 20 is heated by the heater 21, as shown in FIG. 13 part of ice and snow sticking to the surface of the cover 20 (in other words, hydrophilic film 24) is melted. At this time, as shown in FIG. 13, water produced by the melting of ice and snow expands across the hydrophilic film 24 and forms a water film. In other words, water droplets are not prone to be formed on the cover 20.

For example, when a water film is formed between ice and snow and the cover 20 (e.g., hydrophilic film 24), the friction coefficient of the surface of the cover 20 is decreased. In this manner, the water film makes the ice and snow sticking to the cover 20 easier to be peeled off the cover 20.

In the embodiment, for example, a water film is formed on the surface of the cover 20 by melting part of ice and snow sticking to the surface of the cover 20, whereby the remaining part of the ice and snow can be peeled off the cover 20. Thus, it is not necessary to heat the cover 20 by the heater 21 until the ice and snow sticking to the cover 20 are melted completely. In other words, in the embodiment, the time taken to remove the ice and snow from the cover 20 can be made shorter than in the case of melting the ice and snow completely. Once the ice and snow are peeled off the cover 20, it becomes easier to increase the temperature of the cover 20 being heated by the heater 21 and, for example, it becomes easier for the temperature of the cover 20 to reach a set temperature as a reference temperature for a stop of energization of the heater 21. In the monitoring camera 1, since the time to peel off the ice and snow is shortened, the time taken from a start to an end of heating of the cover 20 by the heater 21 can be shortened.

As a result, according to the embodiment, the power consumption of the heater 21 can be made smaller and the efficiency of heating of the cover 20 by the heater 21 can be made higher. Furthermore, since the entire ice and snow can be removed from the cover 20 by melting part of the ice and snow with the heater 21, the time to remove the ice and snow can be made shorter than in a case of melting the entire ice and snow.

In the embodiment, since water produced by melting of ice and snow expands to form a water film instead of forming water droplets, lowering of the visibility of the capturing unit 30 can be suppressed.

In the embodiment, because of the presence of the hydrophilic film 24, water produced by melting of ice and snow forms a water film, as a result of which, for example, dirt components that were contained in the ice and scow float on the water film and are not prone to stick to the surface of the cover 20 (e.g., hydrophilic film 24). Furthermore, for example, since the dirt components that were contained in the ice and scow float on the water film, they tend to flow down instead of sticking to the cover 20. In other words, the dirt components can be removed by a self-cleaning effect of the hydrophilic film 24. Since dirt components are not prone to stick to the cover 20 by virtue of the self-cleaning effect of the hydrophilic film 24, lowering of the visibility of the monitoring camera 1 can be suppressed.

The first to fourth embodiments of the disclosure have been described above.

Figure 14:
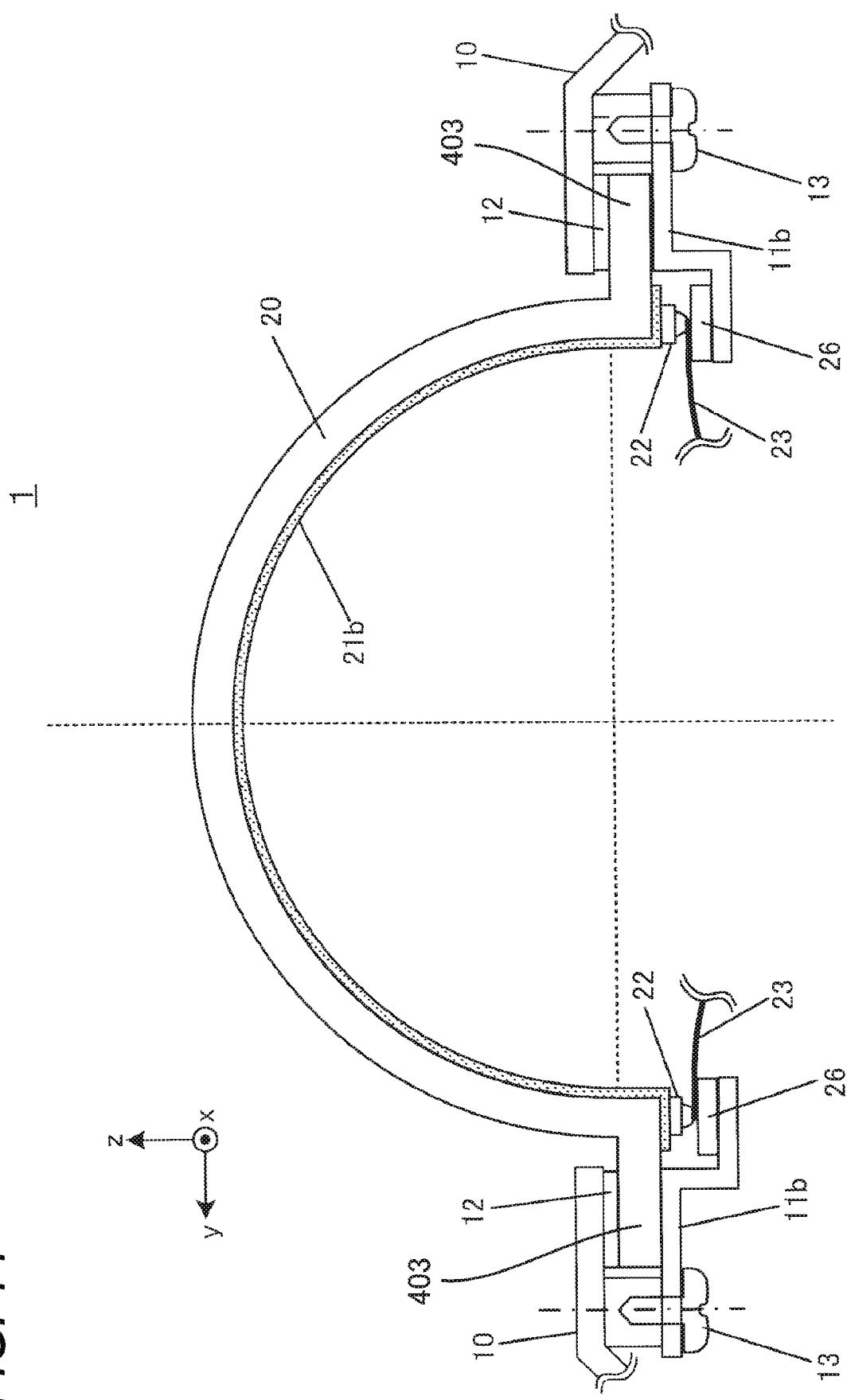
FIG. 14 is a sectional view of another example cover.

The configuration of the monitoring camera 1 is not limited to the configuration shown in FIG. 2. FIG. 14 shows a monitoring camera 1 having another example configuration in which electrodes 22 are provided at different positions than in FIG. 2. For example, as shown in FIG. 14, a heater 21b is formed not only on the inner surface of the curved surface portion of the cover 20 but also on the inner surface of a flange portion 403 of the cover 20. Furthermore, as shown in FIG. 14, the electrodes 22 are not provided at positions on the inner surface of the curved surface portion of the heater 21b but at positions on the inner surface of the flange portion 403 of the cover 20. Furthermore, as shown in FIG. 14, press holding members 26 may be provided between a support member 11b and combinations of an electrode 22 and a lead wire 23, respectively. Each press holding member 26 keeps a state that a pressure is applied to the electrode 22 and the lead wire 23.

In the monitoring camera 1 shown in FIG. 14, since the curved surface portion of the heater 21b is not provided with the electrodes 22, the field of view of the capturing unit 30 can be made wider than in the monitoring camera 1 shown in FIG. 2. In other words, in the monitoring camera 1 shown in FIG. 14, a phenomenon called vignetting can be prevented in which the electrodes 22 are found in an image taken. Furthermore, in the monitoring camera 1 shown in FIG. 14, since the press holding members 26 cause the electrodes 22 and the lead wires 23 to be kept in a pressed state, peeling-off of the electrodes 22 from the heater 21b can be suppressed. For example, even if the electrodes 22 are pulled via the lead wires 23, the electrodes 22 are not prone to peel off the heater 21b by virtue of the pressing by the press holding members 26.

At least two of the first to fourth embodiments may be combined together. For example, the second and third embodiments may be combined with each other in such a manner that a heater 21a formed on a cover 20a whose inner surface has a shape of part of a semisphere (refer to FIGS. 8 and 9, for example) is provided with three or more electrodes 22 as shown in FIG. 10. For another example, the second and fourth embodiments may be combined with each other in such a manner that a hydrophilic film 24 is formed on the outer surface of a cover 20a whose inner surface has a shape of part of a semisphere.

In the monitoring camera 1, for example, the control unit 104 (or the control unit 104 and the conversion unit 103) shown in FIG. 3 or the control unit 204 (or the control unit 204, the conversion unit 103, the detection unit 201, the prediction unit 203) shown in FIG. 11 may be disposed so as to be physically distant from the other constituent elements such as the body 10 and the cover 20 (or cover 20a). For example, the control unit 104 (see FIG. 3) or the control unit 204 (see FIG. 11) may be provided with an information processing apparatus (e.g., server) that is connected to the monitoring camera 1 by a network (e.g., wired or wireless network). For example, the information processing apparatus may control the heater 21 on the basis of information transmitted from each monitoring camera 1 such as temperature information, resistance information, image data taken, or sensor information (in other words, remote control).

Embodiment 5

The configuration of a monitoring camera 1 according to a fifth embodiment is different from that of the monitoring camera 1 according to the first embodiment, (refer to FIGS. 1 and 2, for example) in the contact positions and the contact structures of the heater 21. In the fifth embodiment, the heater 21 may be controlled by the same configuration as in the first embodiment (see FIG. 3, for example).

Figure 15:
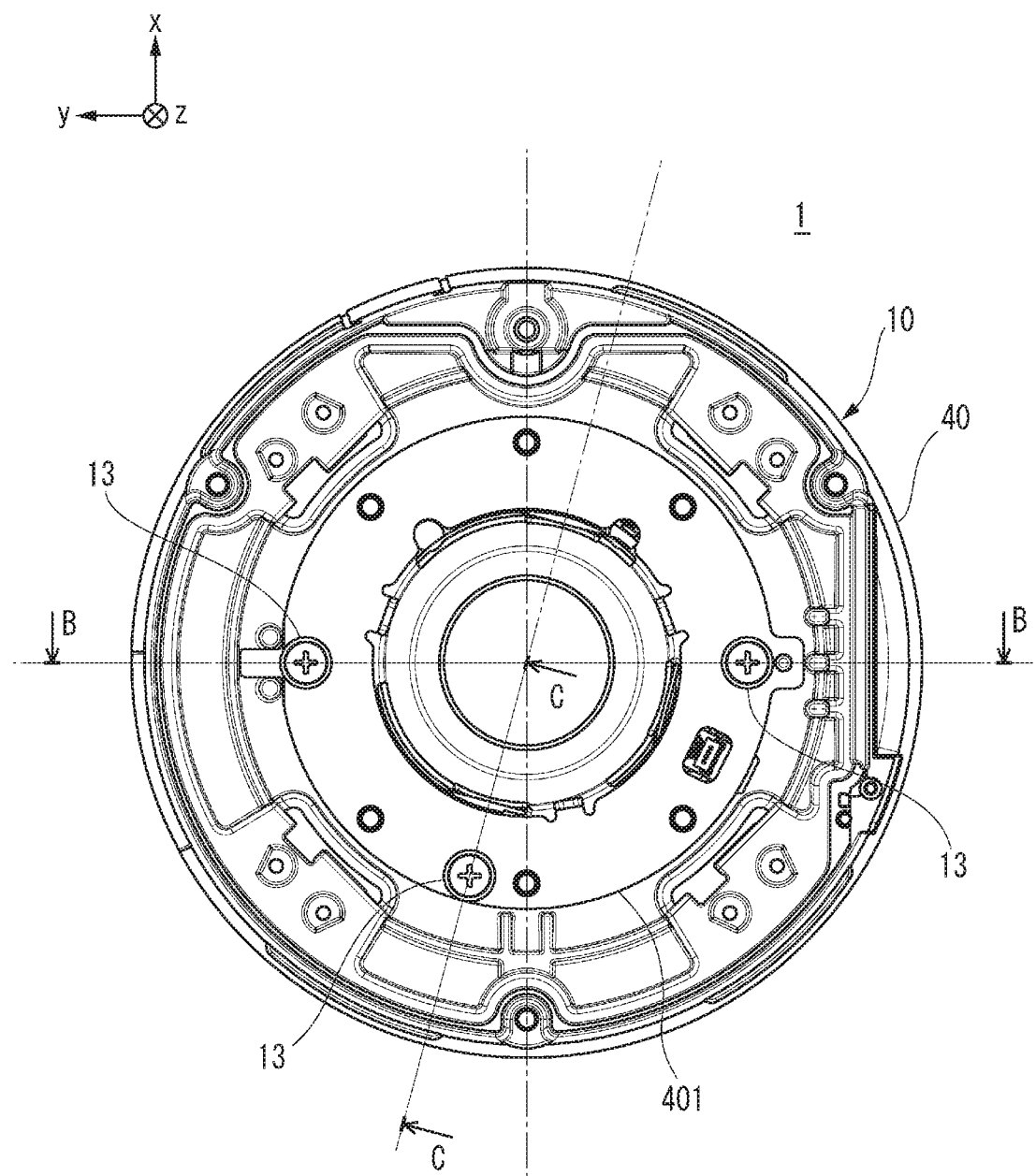
FIG. 15 is a bottom view of a body of a monitoring camera according to a fifth embodiment in which the body is viewed from the side of its bottom surface.

FIG. 15 is a bottom view of a body 10 of the monitoring camera 1 in which the body 10 is viewed from the side of its bottom surface A1 (see FIG. 1). In the fifth embodiment, constituent elements having the same ones in the first embodiment will be given the same reference symbols as the latter and will not be described redundantly.

The body 10 has a ring-shaped shell body 40 as a maximum-diameter outer peripheral portion. The shell body 40 is provided with a ring-shaped presser plate 401 which is fixed to the shell body 40 by plural screws 13. The presser plate 401 corresponds to the support member 11 (see FIG. 2) employed in the first embodiment.

Figure 16:
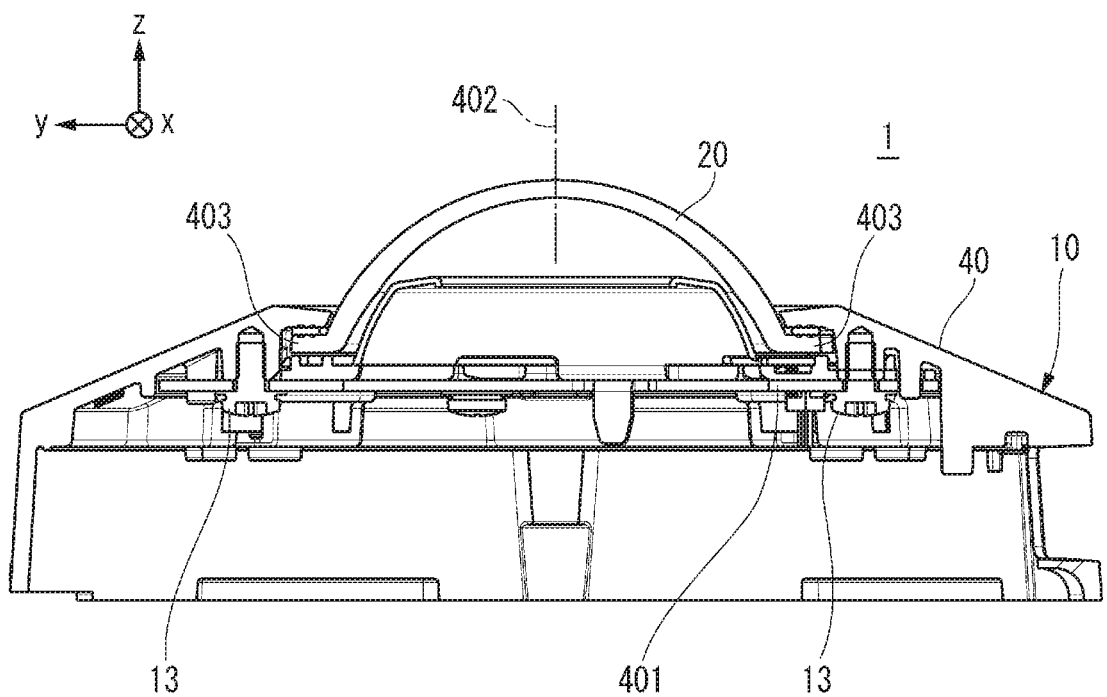
FIG. 16 is a B-B sectional view of FIG. 15.

FIG. 16 is a B-B sectional view of FIG. 15. The inner and outer surfaces of a dome-shaped cover 20 have a shape of a semisphere or part of a semisphere. Alternatively, the cover 20 may have a shape that a cylindrical straight portion is continuous with the opening of a dome shape whose inner and outer surfaces have a shape of a semisphere or part of a semisphere. In the example shown in FIG. 16, the inner and outer surfaces of the cover 20 have a shape of part of a semisphere. This cover 20 is obtained by cutting an original cover member whose inner and outer surfaces have a semisphere shape by an imaginary plane that is perpendicular to the center line 402 passing through the centers of the semisphere surfaces. The top, on the center line 402, of the outer surface of the cover 20 is indicated by arrow A2 (see FIG. 1).

The cover 20 has a circular opening portion on the side opposite to its top. A ring-shaped flange portion 403 which projects outward in the radial direction and perpendicularly to the center line 402 is continuous with the opening portion. The flange portion 403 is fixed to the body 10 by being sandwiched between the presser plate 401 and the shell body 40 via plural other members. That is, the flange portion 403 of the cover 20 is fixed to the body 10.

Figure 17:
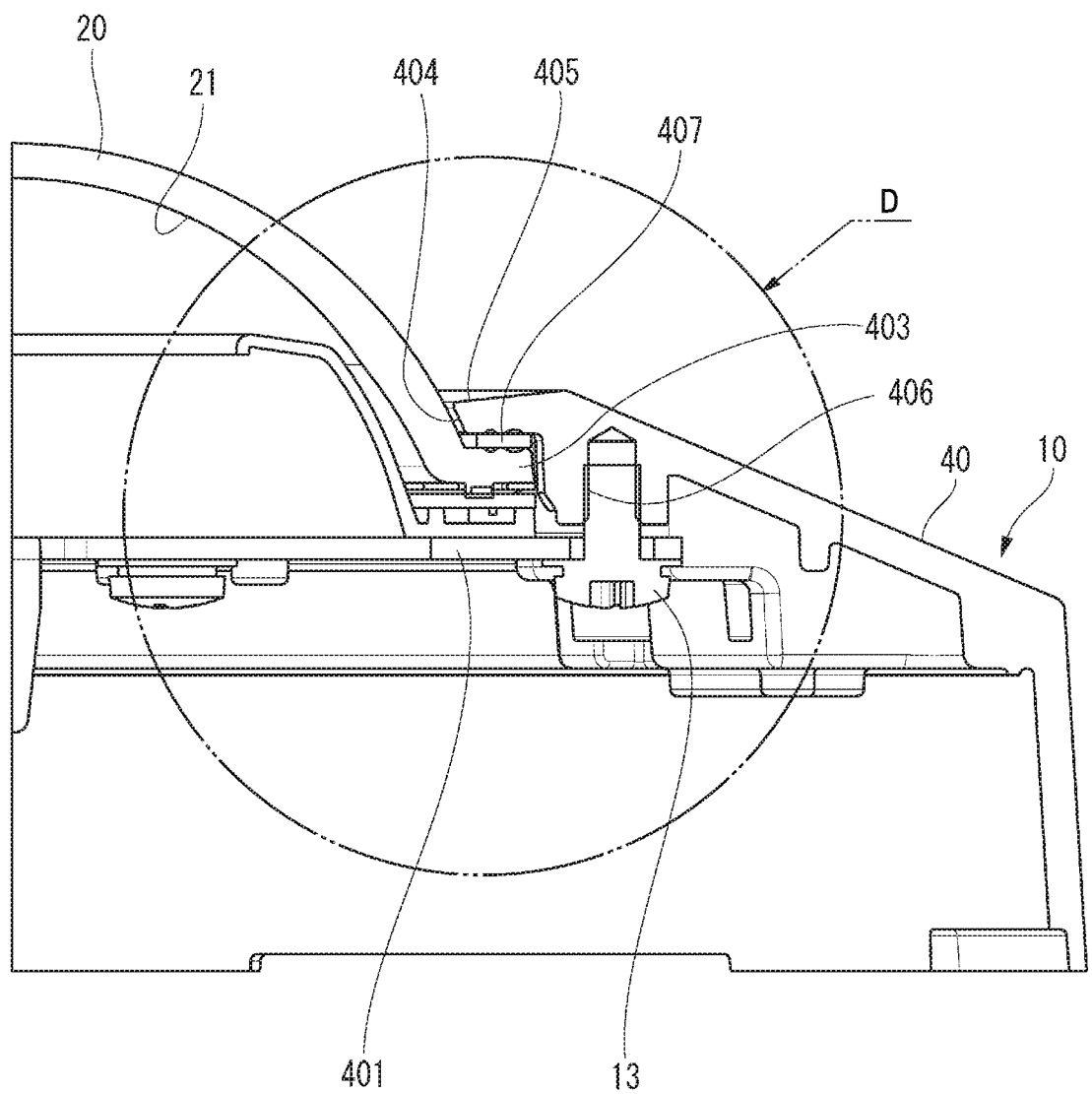
FIG. 17 is a C-C sectional view of FIG. 15.

FIG. 17 is a C-C sectional view of FIG. 15. The shell body 40 has an inside hole 404 through which the cover 20 is inserted. A portion around the inside hole 404 is a brim-shaped flange pressing portion 405. The shell body 40 is formed with screw fixing portions 406 in the vicinities of the flange pressing portion 405 outside in the radial direction. Screws 13 that penetrate through the presser plate 401 are threadedly engaged with the respective screw fixing portions 406. That is, the flange portion 403 is fixed being sandwiched between the flange pressing portion 405 and the presser plate 401.

Figure 18:
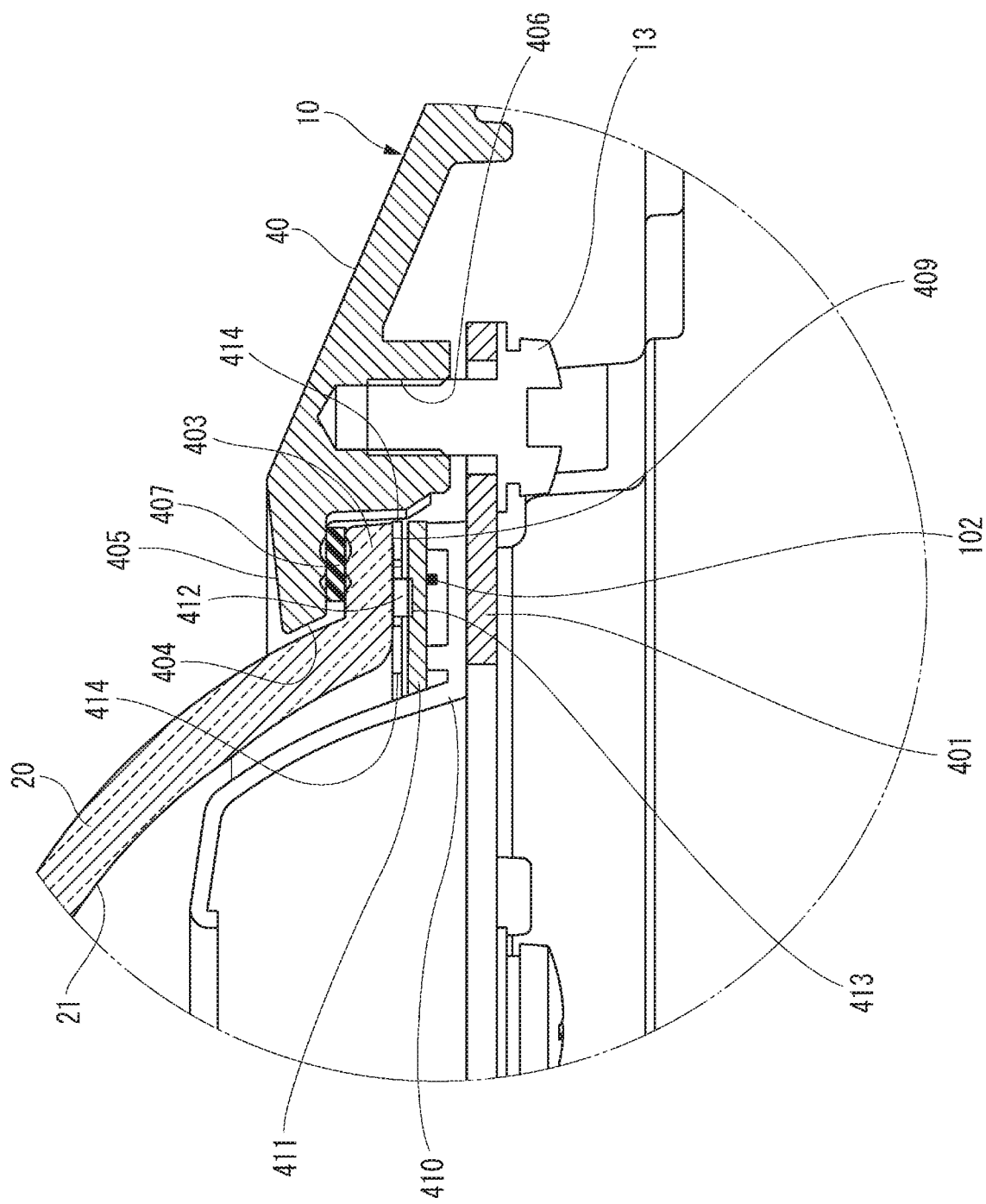
FIG. 18 is an enlarged view of part D of FIG. 17.

FIG. 18 is an enlarged view of part D of FIG. 17. A surface, continuous with the convex curved surface of the cover 20, of the flange portion 403 is an outer flange surface. On the other hand, a surface, continuous with the concave curved surface of the cover 20, of the flange portion 403 is an inner flange surface. A waterproof rubber ring 407 which is a ring-shaped elastic member is sandwiched between the flange pressing portion 405 and the outer flange surface. The flange portion 403 is pressed by the flange pressing portion 405 via the waterproof rubber ring 407. The waterproof rubber ring 407 establishes waterproof sealing between the flange portion 403 and the flange pressing portion 405.

A heater 21 is formed on the inner surface of the cover 20. As in the above-described embodiments, the heater 21 is a transparent or semitransparent conductive film such as an ITO film. In the fifth embodiment, the transparent or semitransparent conductive film is formed so as to extend from the inner surface of the cover 20 to its inner flange surface. No transparent or semitransparent conductive film needs to be formed on the outer flange surface.

The surface of the transparent or semitransparent conductive film formed on the inner flange surface is formed with ITO protective films 409 which serve as electrodes. The ITO protective films 409 are formed by, for example, evaporating or sputtering chromium (Cr; conductive) on the surface of the transparent or semitransparent conductive film. The ITO protective films 409 are formed so as to be thicker and higher in strength than the transparent or semitransparent conductive film. Formed with the ITO protective films 409, the inner flange surface can withstand a contact load that is higher than allowable stress (allowable compressive force, allowable tensile force, allowable shearing force) of the transparent or semitransparent conductive film. As such, the monitoring camera 1 is increased in the durability of the transparent or semitransparent conductive film and the contact structures.

A board presser member 410 is provided on the surface, opposed to the flange portion 403, of the presser plate 401. The board presser member 410 receives stress that is directed from the presser plate 401 toward the flange portion 403. A printed circuit board 411 is provided between the board presser member 410 and the flange portion 403. The printed circuit board 411 is pressed by the board presser member 410 toward the flange portion 403. Electrode pads 413 for supplying power to the heater 21 are formed on the surface, opposed to the flange portion 403, of the printed circuit board 411. The electrode pads 413 are copper foils, for example. Lead wires 23 are connected to the electrode pads via circuit patterns formed on the printed circuit board 411, respectively.

The electrode pads 413 may be formed at positions that are opposed to each other (e.g., spaced from each other by 180°) on a circle on the surface, opposed to the flange portion 403, of the printed circuit board 411.

A resistance measuring member 102 (see FIGS. 2 and 18) such as a thermistor is mounted on the printed circuit board 411. Information obtained by the resistance measuring unit 102 is input to the conversion unit 103. For example, the conversion unit 103 converts a resistance value of the heater 21 indicated by the information received from the resistance measuring unit 102 into a temperature of the heater 21 according to a relationship between the resistance of the heater 21 and the temperature of the transparent or semitransparent film (in other words, temperature characteristic of the resistance). The conversion unit 103 outputs information indicating the temperature of the heater 21 to the control unit 104.

The control unit 104 may control the heater 21 on the basis of the information (e.g., temperature information or resistance information) received from the conversion unit 103.

Elastic and conductive rubber connectors 412 are sandwiched between the ITO protective films 409 and the electrode pads 413, respectively. The rubber connectors 412 are made of an elastic material and has, for example, a plate-like shape. Examples of the plate-like shape are polygons such as a triangle, a square, a rectangle, a pentagon, and a hexagon, a true circle, an ellipse, and an elongated circle. Other examples of the shape of the rubber connectors 412 are a cube, a cuboid, a prism, a truncated cone, a truncated pyramid, and a semisphere. The main material of the rubber connectors 412 is an elastic material such as rubber. Plural linear conductors are buried in each rubber connector 412 so as to extend in the thickness direction parallel with each other. The two end portions of each linear conductor are exposed in the front and back surfaces of the rubber connector 412.

The rubber connectors 412 which are sandwiched between the flange portion 403 and the printed circuit board 411 are crushed being deformed elastically by screwing the screws 13. The two end portions of each linear conductor of each compression-deformed rubber connector 412 project in the thickness direction from the front and back surfaces of the rubber connector 412 and come into contact with the associated ITO protective film 409 and electrode pad 413. In this manner, the heater 21 is electrically connected to the lead wires 23 via the respective rubber connectors 412 and hence can be supplied with power.

Each rubber connector 412 need not always have linear conductors. That is, the rubber connectors 412 may be made of conductive rubber containing a conductive material such as carbon.

At least a pair of spacers 414 are disposed between the flange portion 403 and the printed circuit board 411 at least at each position where a rubber connector 412 is sandwiched. The spacers 414 are made of, for example, rubber that is high in rubber hardness than the rubber connectors 412. The spacers 414 serve as stoppers for preventing excessive compression of the rubber connectors 412 when the rubber connectors 412 are compressed between the flange portion 403 and the printed circuit board 411 by screwing the screws 13. In this manner, buckling destruction of the rubber connectors 412 due to excessive screwing of the screws 13 can be prevented.

In the monitoring camera 1, when the cover 20 is fixed, necessary watertight sealing performance can be secured by compressing the waterproof rubber ring 407 with a proper crushing allowance and electrical connection can be established between the ITO protective films 409 and the electrode pads 413 of the printed circuit board 411 by also compressing the rubber connectors 412, respectively. The electrode pads 413 can be kept pressed against the ITO protective films 409 by elastic repulsive force of the rubber connectors 412, as a result of which the reliability of the contact structures can be increased.

In the monitoring camera 1, since the contact structures for connecting the heater 21 to the lead wires 23 are provided between the flange portion 403 and the presser plate 401, the field of view of the capturing unit 30 (see FIG. 1) can be made wider than in the case where the electrodes are provided on the curved surface of the heater 21. Furthermore, since the electrode pads can be kept pressed against the transparent or semitransparent conductive film and the ITO protective films 409 by the rubber connectors 412, the ITO protective films 409 can be prevented from peeling off the transparent or semitransparent conductive film.

The printed circuit board 411 is in contact with the inner flange surface of the flange portion 403 via the rubber connectors 412 and the spacers 414 and is pressed against the flange portion 403 from behind by the presser plate 401 via the board presser member 410. As a result, the printed circuit board 411 is fixed with high strength between the flange portion 403 and the presser plate 401. The lead wires 23 are connected to the printed circuit board 411. Thus, even when, for example, the printed circuit board 411 is pulled by the lead wires 23 that are receiving external forces, the rubber connectors 412 are not separated from the respective ITO protective films 409 because the printed circuit board 411 is sandwiched and fixed firmly.

Furthermore, the rubber connectors 412 are made of an elastic material and are fixed being sandwiched between the flange portion 403 and the printed circuit board 411 in its thickness direction. In the monitoring camera 1, the resin cover 20 and the metal shell body 40 are different from each other in linear expansion coefficient. As a result, a displacement occurs between the ITO protective films 409 and the printed circuit board 411 due to a temperature variation. This displacement is particularly large in a plane that is parallel with the flange portion 403.

In the monitoring camera 1, the ITO protective films 409 are electrically connected to the printed circuit board 411 by the respective rubber connectors 412 which are elastic. As a result, a relative displacement between the ITO protective films 409 and the printed circuit board 411 in a plane (X-Y plane) parallel with the flange portion 403 can be absorbed by elastic deformation of the rubber connectors 412 in a shearing direction. This increases the reliability of the contact structures of the monitoring camera 1 further.

The present disclosure can be implemented using software, hardware, or software that works in cooperation with hardware. Each of the functional blocks used in describing the embodiments may be implemented, partially or totally, as an LSI which is an integrated circuit, and each of processes described in the embodiments may be controlled, partially or totally, by one LSI or a combination of LSIs. LSIs may be individual chips or constituted by one chip so as to include part or all of a functional block. Each LSI may be equipped with portions for input and output of data. Each LSI may be called an IC, a system LSI, a super-LSI, or an ultra-LSI depending on its integration density. The technique for producing an integrated circuit is not limited to that for producing an LSI; each integrated circuit may be implemented as a dedicated circuit, a general-purpose processor, or a dedicated processor. Each integrated circuit may be implemented as an FPGA (field programmable gate array) which can be programmed after manufacture of an LSI or a reconfigurable processor in which the connections or settings of circuit cells provided inside an LSI are reconfigurable.

The disclosure can be implemented by digital processing or analog processing. Furthermore, if an integrated circuit technology to replace the LSI technology appears as a result of advancement of the semiconductor technologies or development of another, spin-off technology, functional blocks may naturally be integrated using that technology. For example, application of a biotechnology is a promising candidate.

Programs can be provided that describe processing details of the functions to be performed by the monitoring camera 1. The above-described processing functions (heater control methods) can be implemented on a computer by executing those programs by the computer.

The present disclosure is useful when applied to dome-shaped monitoring cameras.

The present application is based upon Japanese Patent Application (Patent Application No. 2019-127736 filed on Jul. 9, 2019 and No. 2019-239171 filed on Dec. 27, 2019), the content of which is incorporated herein by reference.

What is claimed is:

1. A monitoring camera comprising:
   a capturing unit;
   a cover that has a dome-shaped curved portion and a flange portion and configured to cover the capturing unit;
   a transparent conductive film provided on an inner surface of the dome-shaped curved portion and the flange portion;
   a pair of printed circuit boards disposed at the flange portion; and
   a pair of electrodes configured to supply power to the conductive film,
   wherein each of the electrodes is an Indium-Tin-Oxide protective film which covers the conductive film, and
   the Indium-Tin-Oxide protective film is electrically connected to an electrode pad of each of the printed circuit boards via an elastic and conductive rubber connector.

2. The monitoring camera according to claim 1, wherein:
   the rubber connector and a spacer are provided between the flange portion and each of the printed circuit boards; and the spacer is higher than the rubber connector in rubber hardness.

3. The monitoring camera according to claim 2, wherein:
the flange portion and each of the printed circuit boards, which sandwiching the rubber connector and the spacer therebetween, are fixed and sandwiched between a shell body disposed outside the flange portion and a metal presser plate disposed outside the printed circuit board.

4. The monitoring camera according to claim 1, further comprising:
a hydrophilic film provided on an outer surface of the cover.

5. A monitoring camera, comprising:
a capturing unit;
a cover that has a dome-shaped curved portion and a flange portion and configured to cover the capturing unit;
a transparent conductive film provided on an inner surface of the dome-shaped curved portion and the flange portion;
a pair of electrodes configured to supply power to the conductive film;
a measuring unit configured to measure a resistance value of the conductive film; and
a controller configured to control supply of power to the conductive film based on a measurement result of the resistance value.

6. The monitoring camera according to claim 5, wherein:
the controller is configured to control the supply of power based on a temperature characteristic of the resistance value of the conductive film.

7. The monitoring camera according to claim 5, wherein:
the measuring unit is configured to measure the resistance value of the conductive film based on a voltage developed across the conductive film in a state that the controller is supplying a constant current to the conductive film or a current flowing through the conductive film in a state that the controller causes a constant voltage to develop across the conductive film.

8. A monitoring camera, comprising:
a capturing unit;
a cover that has a dome-shaped curved portion and a flange portion and configured to cover the capturing unit;
a transparent conductive film provided on an inner surface of the dome-shaped curved portion and the flange portion; and
a pair of electrodes configured to supply power to the conductive film,
wherein a length of each of the pair of electrodes along a circular circumference of the inner surface of the dome-shaped curved portion of the cover is set based on a first path length of a current flowing between the pair of electrodes along the circular circumference and a second path length of a current flowing between the pair of electrodes past a top of the dome-shaped curved portion.

9. The monitoring camera according to claim 8, wherein:
a length of each of the pair of electrodes along the circular circumference of the dome-shaped curved portion of the cover is set so that the first path length and the second path length coincide with each other.

10. A monitoring camera comprising:
a capturing unit;
a cover that covers the capturing unit;
a transparent conductive film provided on an inner surface of the cover;
three or more electrodes disposed on the conductive film at different positions; and
a controller configured to select a pair of electrodes among the three or more electrodes to supply power to the conductive film via the selected electrodes.

11. The monitoring camera according to claim 10, wherein:
the controller is configured to select the pair of electrodes based on an image captured by the capturing unit.

12. The monitoring camera according to claim 10, wherein:
the controller is configured to select a pair of electrodes based on information relating to an environment of the monitoring camera.

* * * * *